(12) United States Patent
Yutani et al.

(10) Patent No.: US 10,509,826 B2
(45) Date of Patent: Dec. 17, 2019

(54) SERVER DEVICE, CLIENT DEVICE, INFORMATION PROCESSING METHOD, AND RECORDING MEDIUM

(71) Applicant: SONY CORPORATION, Tokyo (JP)

(72) Inventors: Tetsuo Yutani, Kanagawa (JP); Goragot Wongpaisarnsin, Bangkok (TH)

(73) Assignee: SONY CORPORATION, Tokyo (JP)

( * ) Notice: Subject to any disclaimer, the term of this patent is extended or adjusted under 35 U.S.C. 154(b) by 905 days.

(21) Appl. No.: 15/026,919

(22) PCT Filed: Jul. 2, 2014

(86) PCT No.: PCT/JP2014/067696
§ 371 (c)(1),
(2) Date: Apr. 1, 2016

(87) PCT Pub. No.: WO2015/052968
PCT Pub. Date: Apr. 16, 2015

(65) Prior Publication Data
US 2016/0292298 A1    Oct. 6, 2016

(30) Foreign Application Priority Data

Oct. 8, 2013   (JP) .................................. 2013-211282

(51) Int. Cl.
*G06F 16/901* (2019.01)
*G06F 16/957* (2019.01)
(Continued)

(52) U.S. Cl.
CPC .......... *G06F 16/9014* (2019.01); *G06F 13/00* (2013.01); *G06F 16/9574* (2019.01); *H04L 67/42* (2013.01)

(58) Field of Classification Search
CPC ............. G06F 16/9014; G06F 16/9574; G06F 16/9566; H04L 63/0281; H04N 7/173
See application file for complete search history.

(56) References Cited

U.S. PATENT DOCUMENTS

| | | | |
|---|---|---|---|
| 6,195,622 B1 * | 2/2001 | Altschuler .......... | G06F 16/9574 703/2 |
| 8,645,505 B2 * | 2/2014 | Zenner ................ | H04L 63/0281 709/219 |

(Continued)

FOREIGN PATENT DOCUMENTS

| | | |
|---|---|---|
| JP | 2000-222273 A | 8/2000 |
| JP | 2003-281023 A | 10/2003 |

(Continued)

OTHER PUBLICATIONS

Akira Matsuda, "Shokai Rails 4 'Shijo Saiko' no Shin Version o Tettei Shokai! Dai 3 sho Jikko mo Kaihatsu mo Kosoku na Rails", Asset Pipeline, Turbolinks, ActionController::Live . . . , WEB+DB Press, Mar. 25, 2013, vol. 73, (9 pages).

(Continued)

*Primary Examiner* — Etienne P Leroux
(74) *Attorney, Agent, or Firm* — Xsensus, LLP

(57) ABSTRACT

[Object] To speed up provision of a document to a client by utilizing throughput of a server in a system in which the server provides the document in response to a request from the client.
[Solution] Provided is a server device including: a document acquisition unit configured to acquire a document including a reference to a resource in response to a request from a client; an identifier generation unit configured to generate an identifier unique to content of the resource; an identifier writing unit configured to associate the identifier with the reference to the resource in the document; and a document (Continued)

transmission unit configured to transmit the document and the identifier associated with the reference to the resource to the client.

16 Claims, 28 Drawing Sheets

(51) Int. Cl.
*G06F 13/00* (2006.01)
*H04L 29/06* (2006.01)

(56) References Cited

U.S. PATENT DOCUMENTS

| | | | |
|---|---|---|---|
| 2003/0187960 | A1 | 10/2003 | Koba et al. |
| 2007/0244920 | A1* | 10/2007 | Palliyil ............... G06F 16/9014 |
| 2009/0249425 | A1* | 10/2009 | Teramoto ............... H04N 7/173 |
| | | | 725/120 |
| 2012/0102221 | A1* | 4/2012 | Grieve ................ G06F 16/9566 |
| | | | 709/238 |

FOREIGN PATENT DOCUMENTS

| | | |
|---|---|---|
| JP | 2004-185263 A | 7/2004 |
| JP | 2007-188514 A | 7/2007 |
| JP | 2011-108102 | 6/2011 |

OTHER PUBLICATIONS

International Search Report dated Sep. 22, 2014 in PCT/JP2014/067696 filed on Jul. 2, 2014.

* cited by examiner

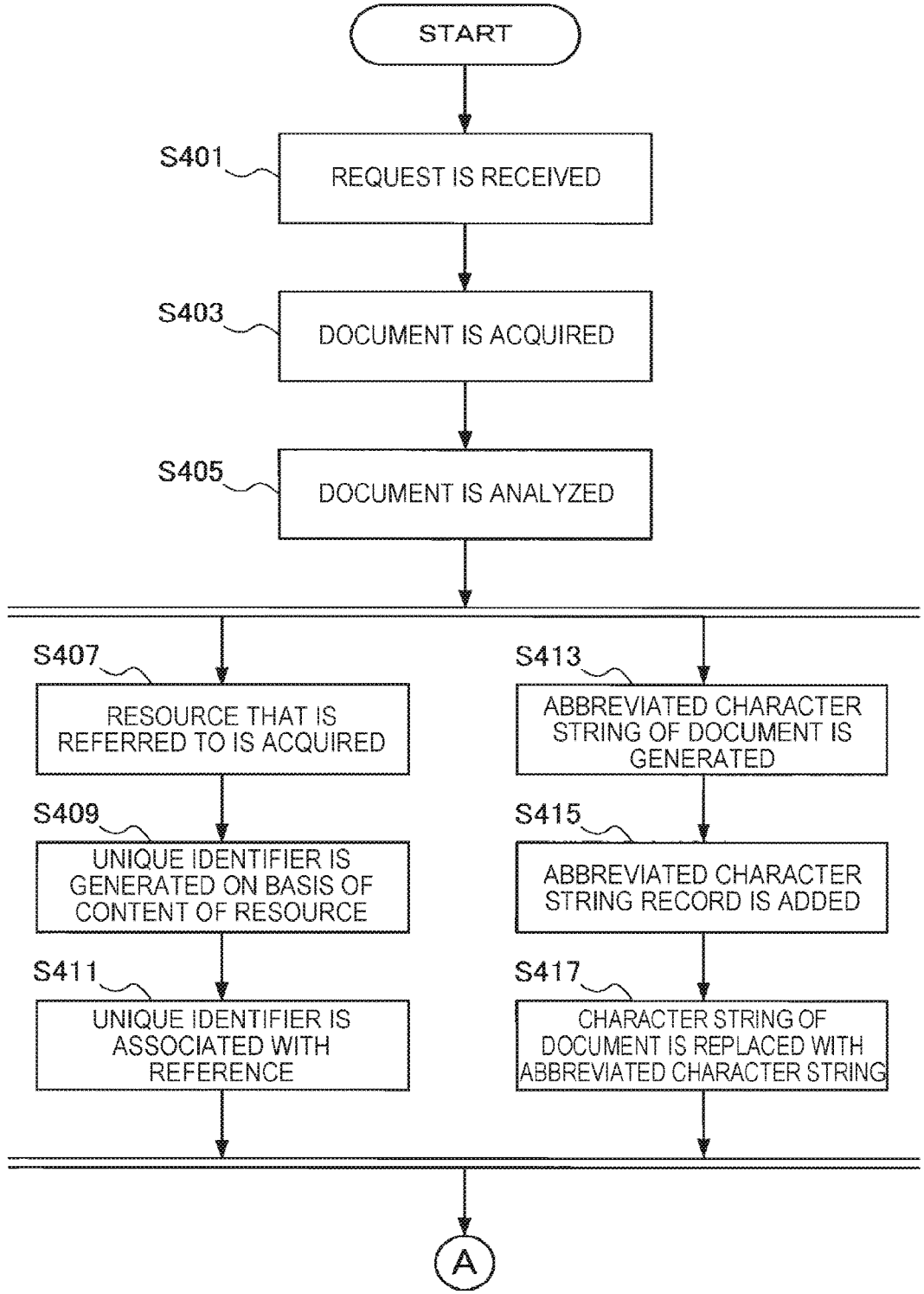

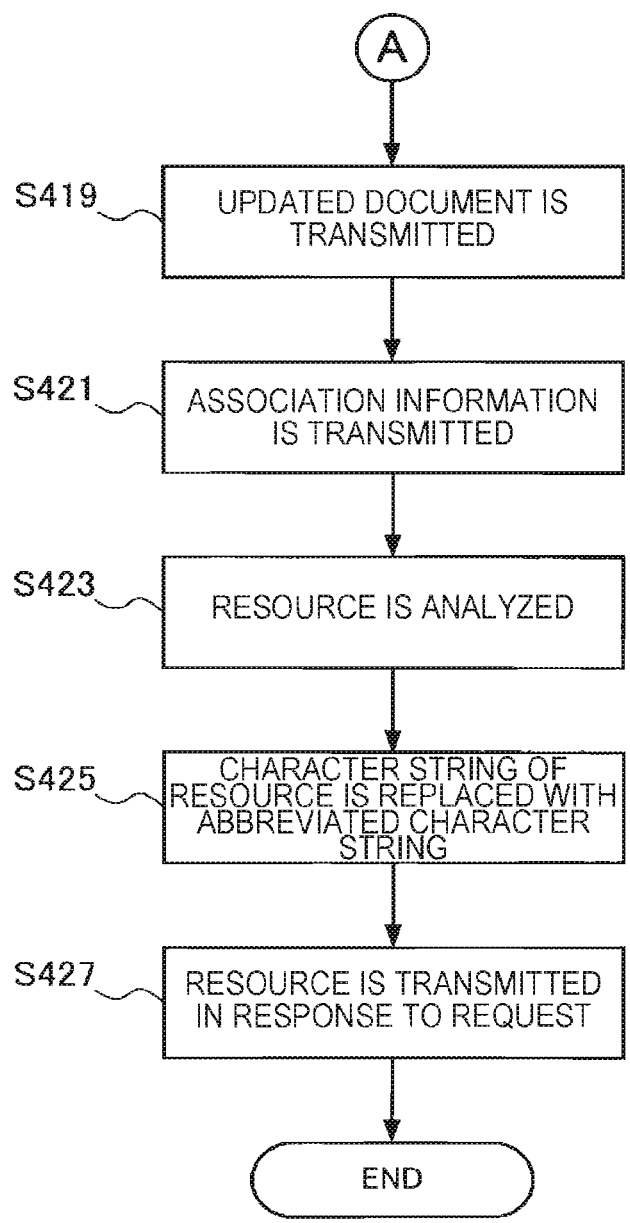

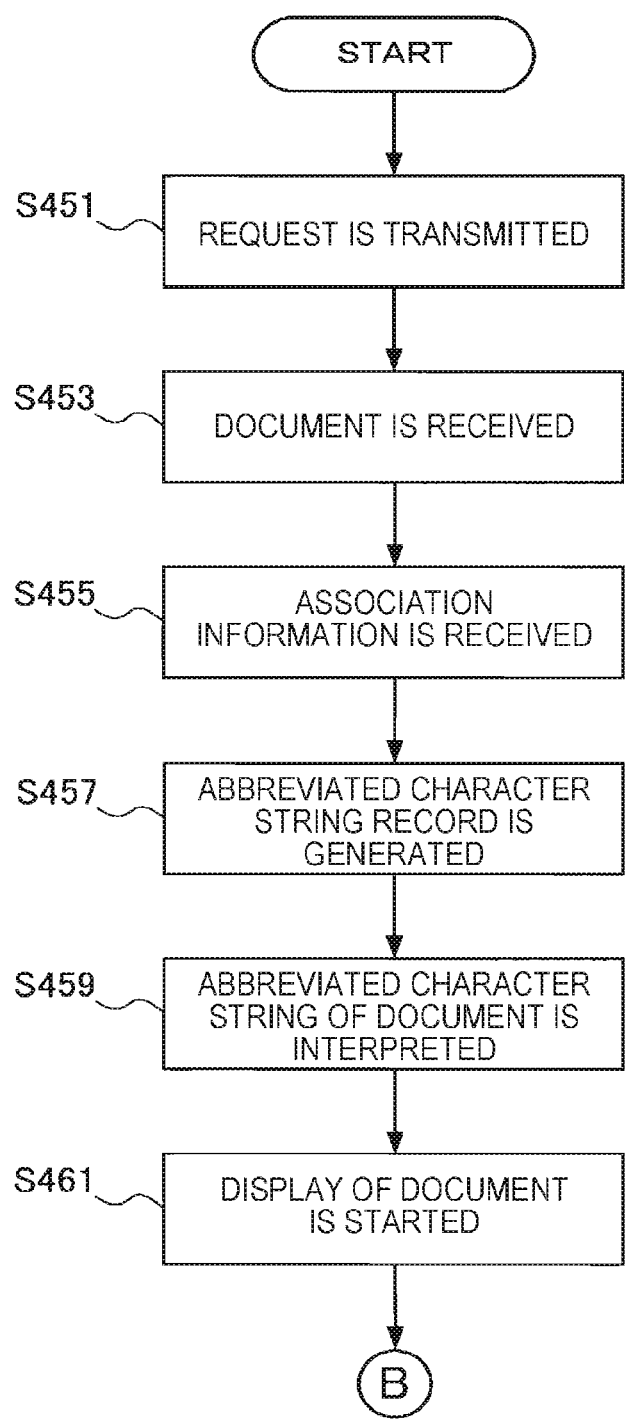

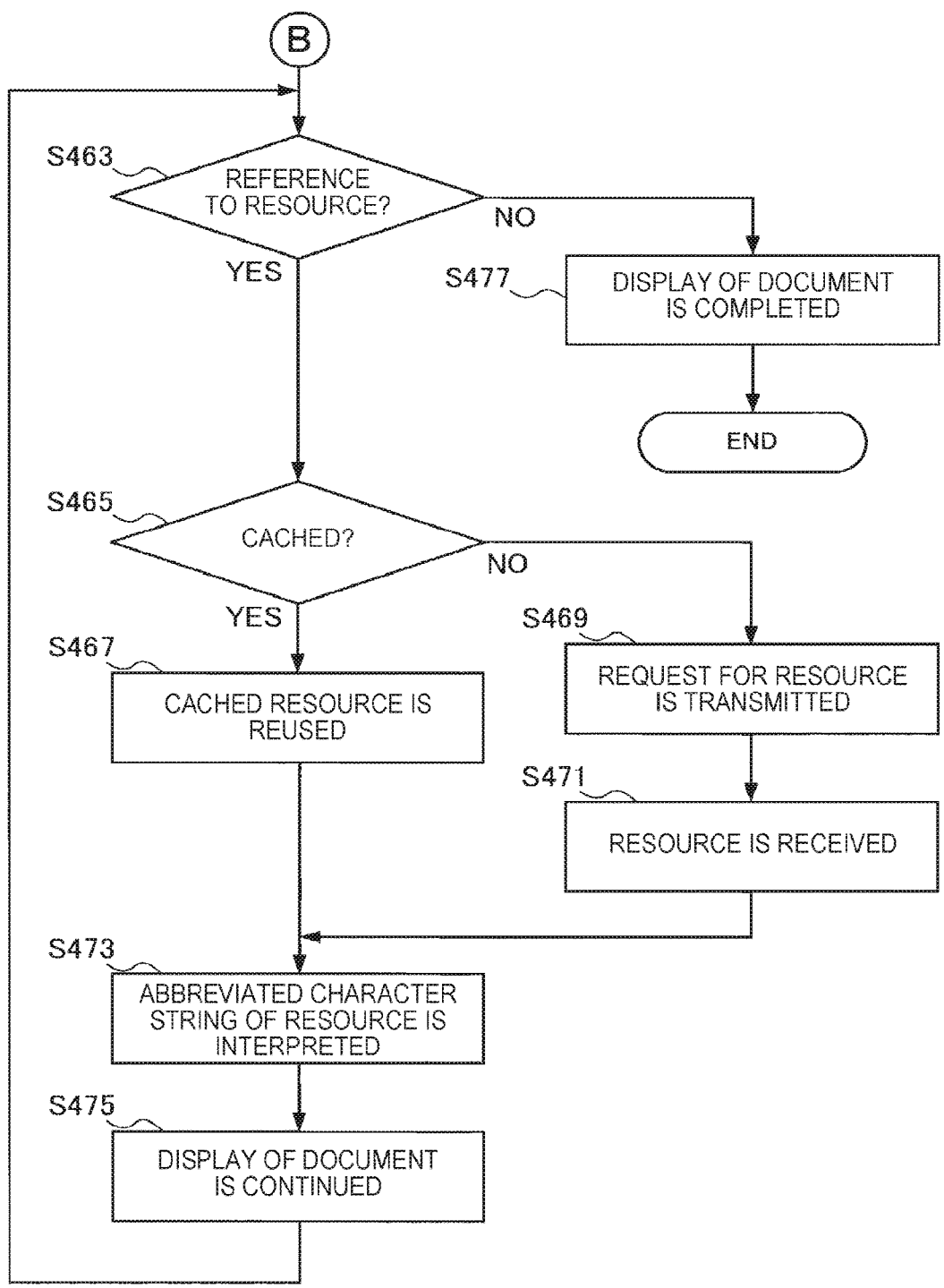

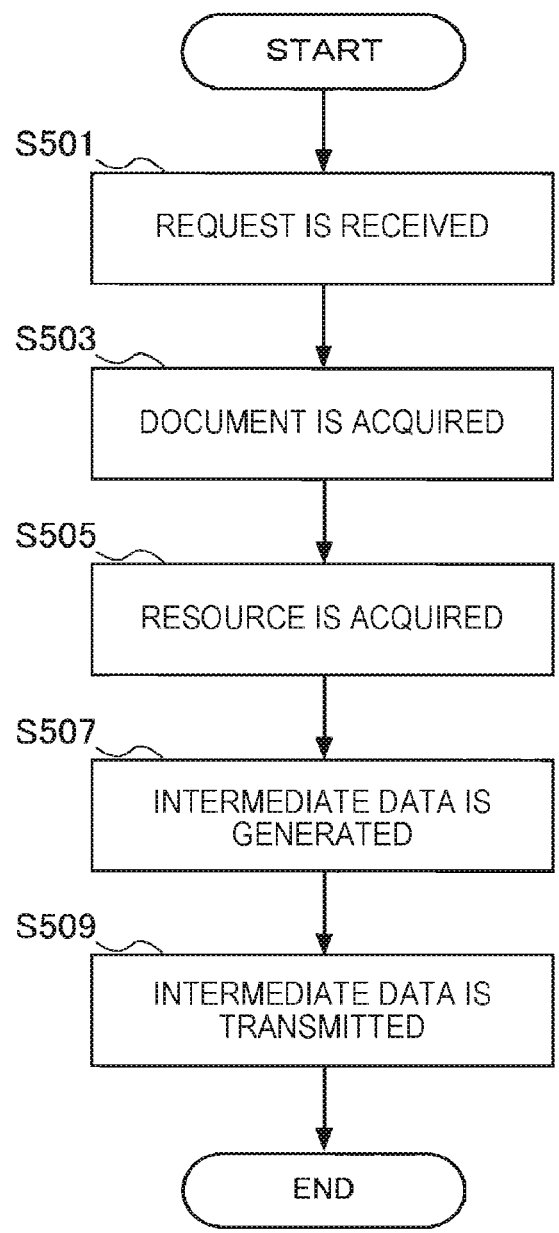

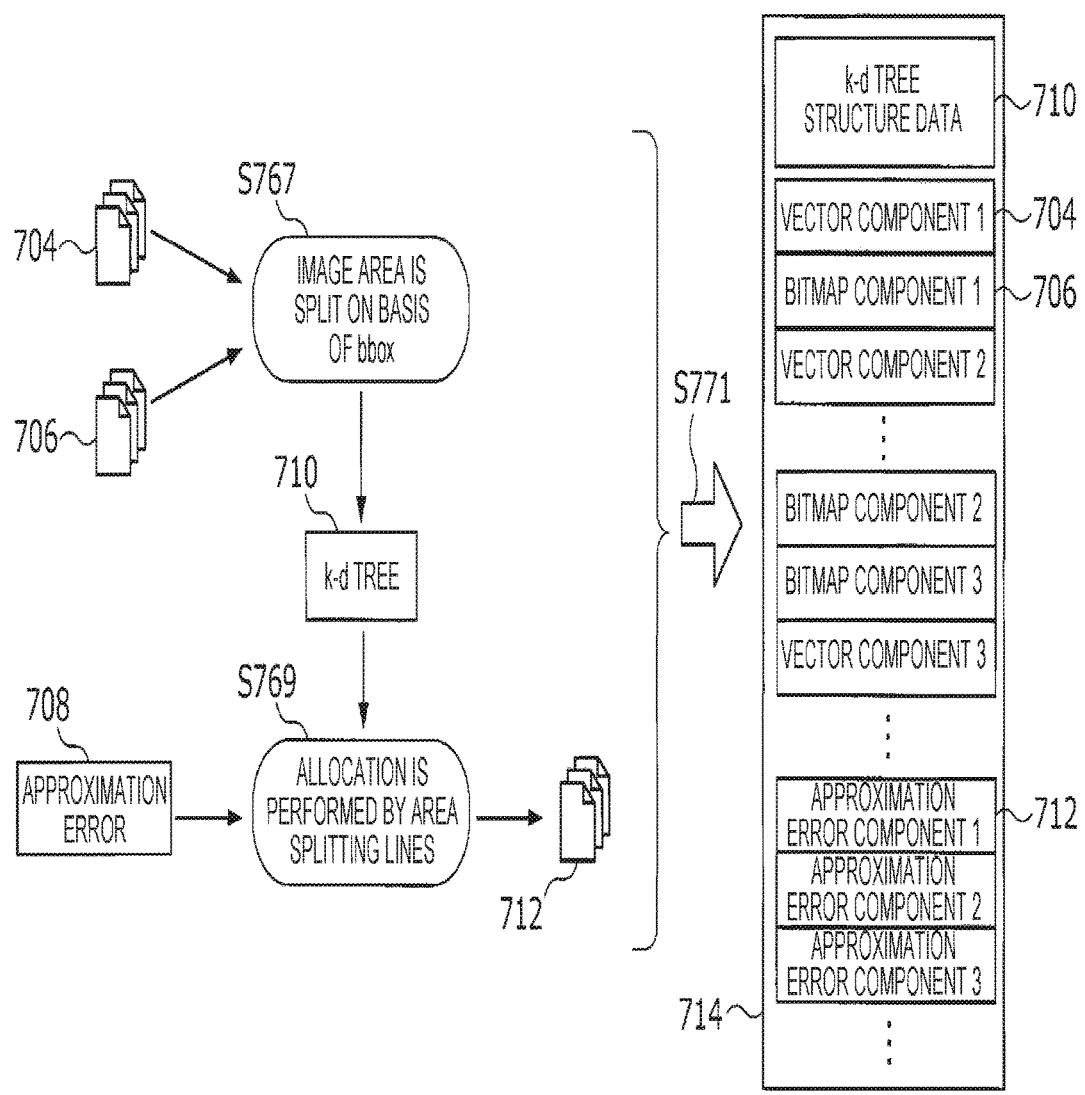

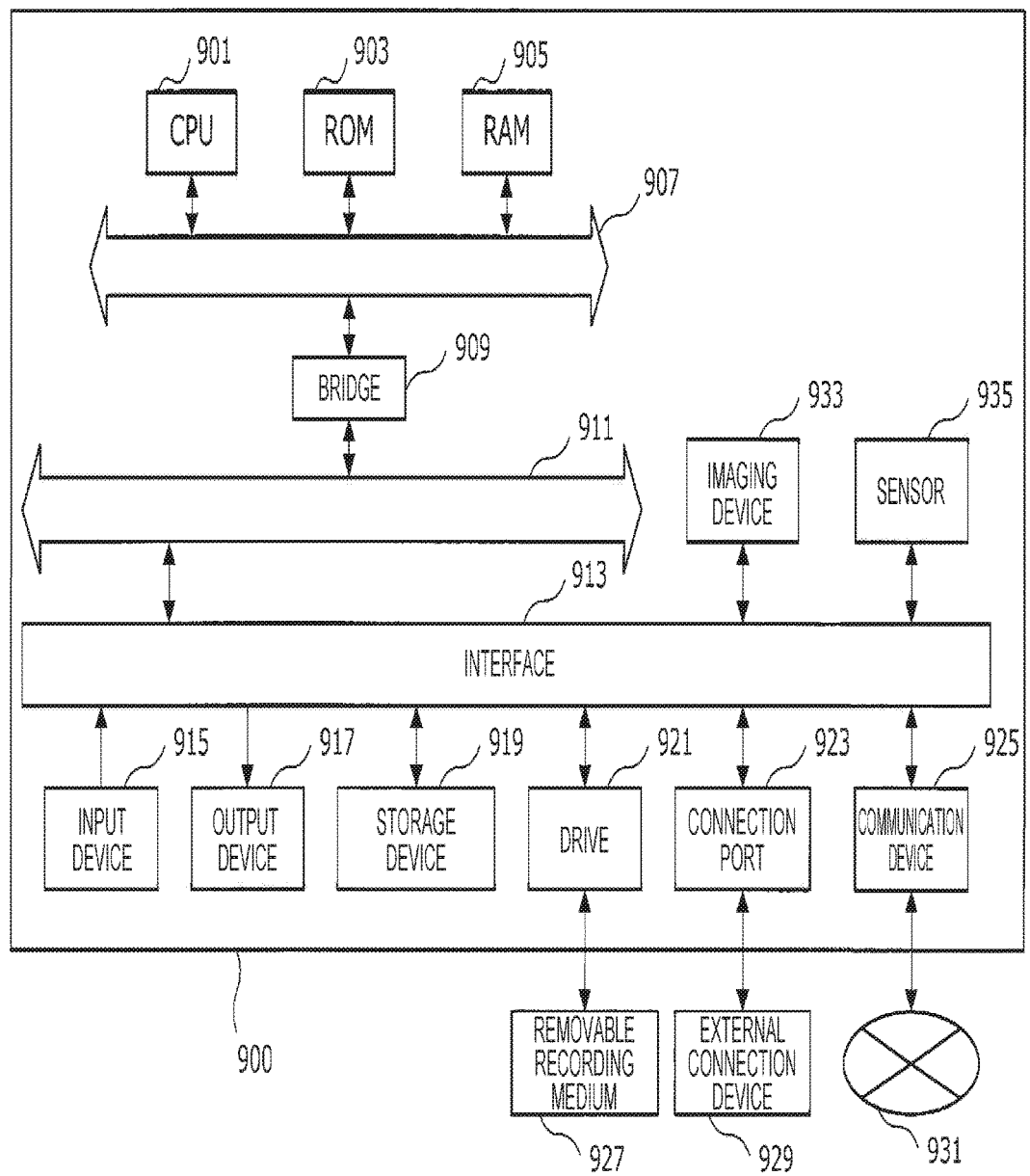

SERVER DEVICE, CLIENT DEVICE, INFORMATION PROCESSING METHOD, AND RECORDING MEDIUM

TECHNICAL FIELD

The present disclosure relates to a server device, a client device, an information processing method, and a recording medium.

BACKGROUND ART

A system in which a server provides a document in response to a request from a client, such as the world wide web (WWW) that provides a hyper text markup language (HTML) document, has been widely diffused recently. In such a system, reduction in a time required for providing a document to a client, i.e., more specifically, reduction in a time between transmission of a request from a client and display of a document in the client is a problem that has been attempted to be solved for a long time. For example, Patent Literature 1 discloses a technique that caches a content in a web server in order to efficiently use a cache even in the case where access to a memory resource or a web service is limited.

CITATION LIST

Patent Literature

Patent Literature 1: JP 2011-108102A

SUMMARY OF INVENTION

Technical Problem

However, a rich document referring to various resources, such as a still image/a moving image and a script in an HTML, tends to be increased, and therefore further progress of a speed-up technique such as the above technique is demanded. Although improvement in throughput of a server and a client contributes to speeding up of the system, it is not always easy to improve the throughput in the case where the client is, for example, a mobile device.

In view of this, the present disclosure proposes a server device, a client device, an information processing method, and a recording medium in a system in which a server provides a document in response to a request from a client, each of which is new and improved and is capable of speeding up provision of a document to the client by utilizing throughput of the server.

Solution to Problem

According to the present disclosure, there is provided a server device, including: a document acquisition unit configured to acquire a document including a reference to a resource in response to a request from a client; an identifier generation unit configured to generate an identifier unique to content of the resource; an identifier writing unit configured to associate the identifier with the reference to the resource in the document; and a document transmission unit configured to transmit the document and the identifier associated with the reference to the resource to the client.

According to the present disclosure, there is provided a client device, including: a request transmission unit configured to transmit a request to a server; a document reception unit configured to receive, from the server, a document including a reference to a resource, the document being transmitted from the server in response to the request, and an identifier that is associated with the reference to the resource and is unique to content of the resource; and a cache determination unit configured to determine whether or not the resource is stored in a cache on the basis of the identifier.

According to the present disclosure, there is provided an information processing method, including: acquiring a document including a reference to a resource in response to a request from a client; generating an identifier unique to content of the resource; associating, with the use of a processor, the identifier with the reference to the resource in the document; and transmitting the document and the identifier associated with the reference to the resource to the client.

According to the present disclosure, there is provided a non-transitory tangible recording medium having a program recorded thereon, the program causing a computer to realize a function of transmitting a request to a server, a function of receiving, from the server, a document including a reference to a resource, the document being transmitted in response to the request, and an identifier that is associated with the reference to the resource and is unique to content of the resource, and a function of determining whether or not the resource is stored in a cache on the basis of the identifier.

Advantageous Effects of Invention

According to the present disclosure as described above, in a system in which a server provides a document in response to a request from a client, it is possible to speed up provision of a document to the client by utilizing throughput of the server.

BRIEF DESCRIPTION OF DRAWINGS

FIG. 15A is a flowchart showing processing of the intermediate server according to Embodiment 4 of the present disclosure.

FIG. 15B is a flowchart showing processing of the intermediate server according to Embodiment 4 of the present disclosure.

FIG. 16A is a flowchart showing processing of the client according to Embodiment 4 of the present disclosure.

FIG. 16B is a flowchart showing processing of the client according to Embodiment 4 of the present disclosure.

FIG. 17 is a flowchart showing processing of an intermediate server according to Embodiment 5 of the present disclosure.

FIG. 23 is a diagram for explaining processing for generating an image file in accordance with an image format that is applicable in Embodiment 7 of the present disclosure.

FIG. 24 is a block diagram for explaining an example of a hardware configuration of an information processing device according to an embodiment of the present disclosure.

DESCRIPTION OF EMBODIMENTS

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

Figure 1:
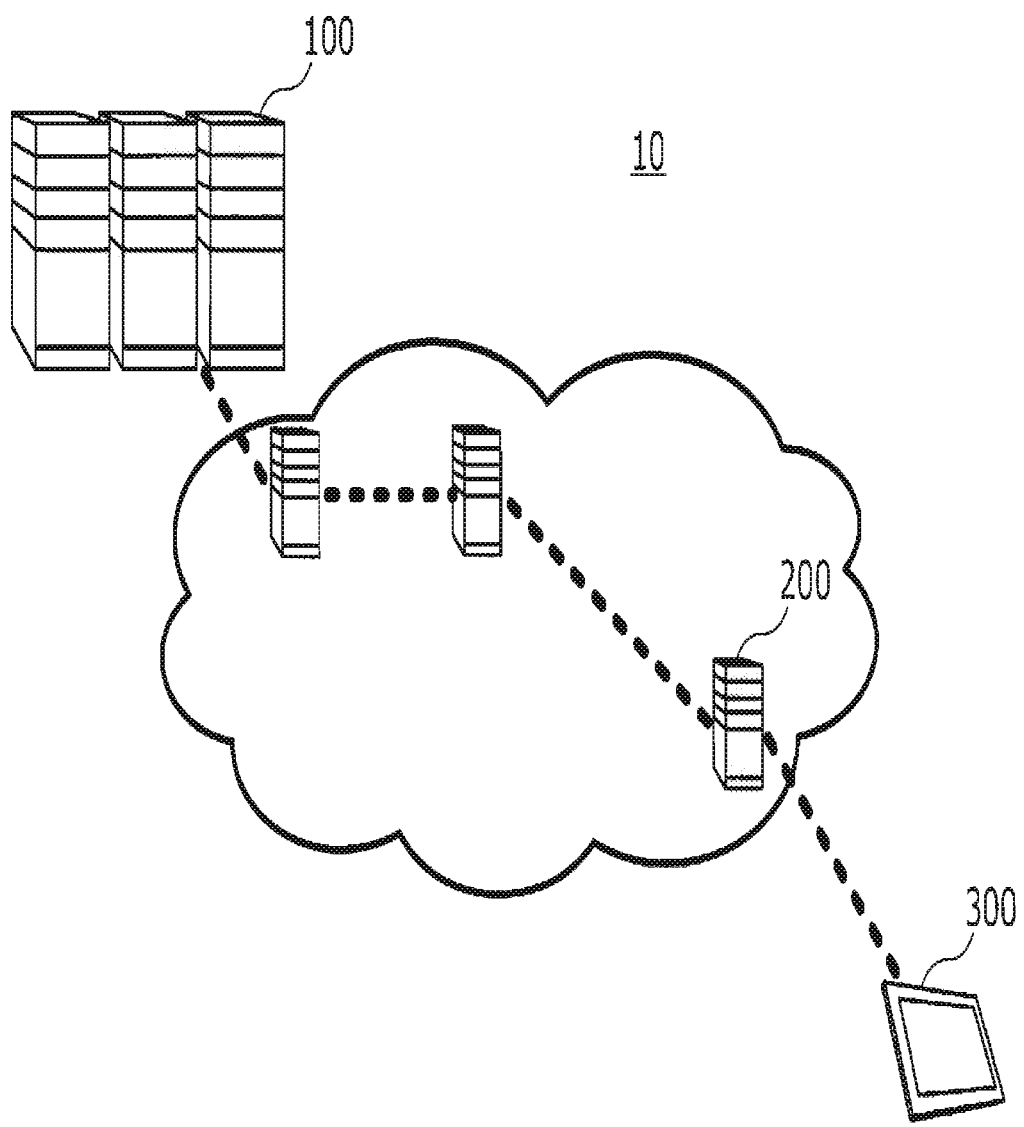
FIG. 1 shows a schematic configuration of a system to which some embodiments of the present disclosure are applied.

Note that description will be provided in the following order.
1. System Configuration
2. Embodiment 1
2-1. Function Configuration
2-2. Processing Flow
2-3. Modification Example
3. Embodiment 2
3-1. Function Configuration
3-2. Processing Flow
4. Embodiment 3
4-1. Function Configuration
4-2. Processing Flow
4-3. Modification Example
5. Embodiment 4
5-1. Function Configuration
5-2. Processing Flow
6. Embodiment 5
7. Embodiment 6
8. Embodiment 7
8-1. Function Configuration
8-2. Processing Flow
8-3. Example of Transcoding
8-4. Example of Format
8-5. Example of Decoding Processing
9. Hardware Configuration
10. Supplementary Explanation 1. System Configuration FIG. 1 shows a schematic configuration of a system to which some embodiments of the present disclosure are applied. When referring to FIG. 1, a system 10 includes a distribution source server 100, an intermediate server 200, and a client 300. The distribution source server 100, the intermediate server 200, and the client 300 are connected to one another via a network such as the Internet.

Each of both the distribution source server 100 and the intermediate server 200 is a server realized by one or a plurality of server devices. The distribution source server 100 holds a document to be provided to a user and a resource referred to by the document. The document and the resource are distributed from the distribution source server 100 to the client 300 via the one or plurality of intermediate servers 200 in response to a request from the client 300. For example, when the intermediate server 200 holds a document and a resource as caches and distributes the cached document and resource to the client 300 instead of the distribution source server 100, the document can be quickly provided to the client 300.

Part of the document and the resource is also held in the client 300 as a cache. In the case where the document and the resource are held in the client 300, it is unnecessary to transmit and receive data via a network, and therefore the document is displayed more quickly. However, an amount of cache that can be held in the client 300 is limited, and therefore it is advantageous to provide the intermediate server 200 that can hold more caches. The intermediate server 200 not only holds caches but also can execute various kinds of speed-up processing as described in embodiments described below.

Note that the one or plurality of server devices realizing the distribution source server 100 or the intermediate server 200 can be an information processing device(s) including a processor such as a central processing unit (CPU). The client 300 can also be realized by an information processing device including a processor. The client 300 may further include output devices such as a display and a speaker, an input device such as a touchscreen panel, an image pickup device, and the like. More specifically, for example, the client 300 can be a device such as a smartphone, a personal computer, a tablet, a media player, a television, and a game console. A specific hardware configuration of the information processing device realizing each device described above will be described in more detail below.

The system 10 can be used to distribute a document written in a markup language such as HTML. In this case, the resource can be, for example, a script such as JavaScript, style definition information such as cascading style sheets (CSS), a still image, and a moving image. Note that the system 10 can be used to distribute not only a document written in a markup language but also various documents and data (including a still image, a moving image, and the like) other than the documents.

2. Embodiment 1

2-1. Function Configuration

Figure 2:
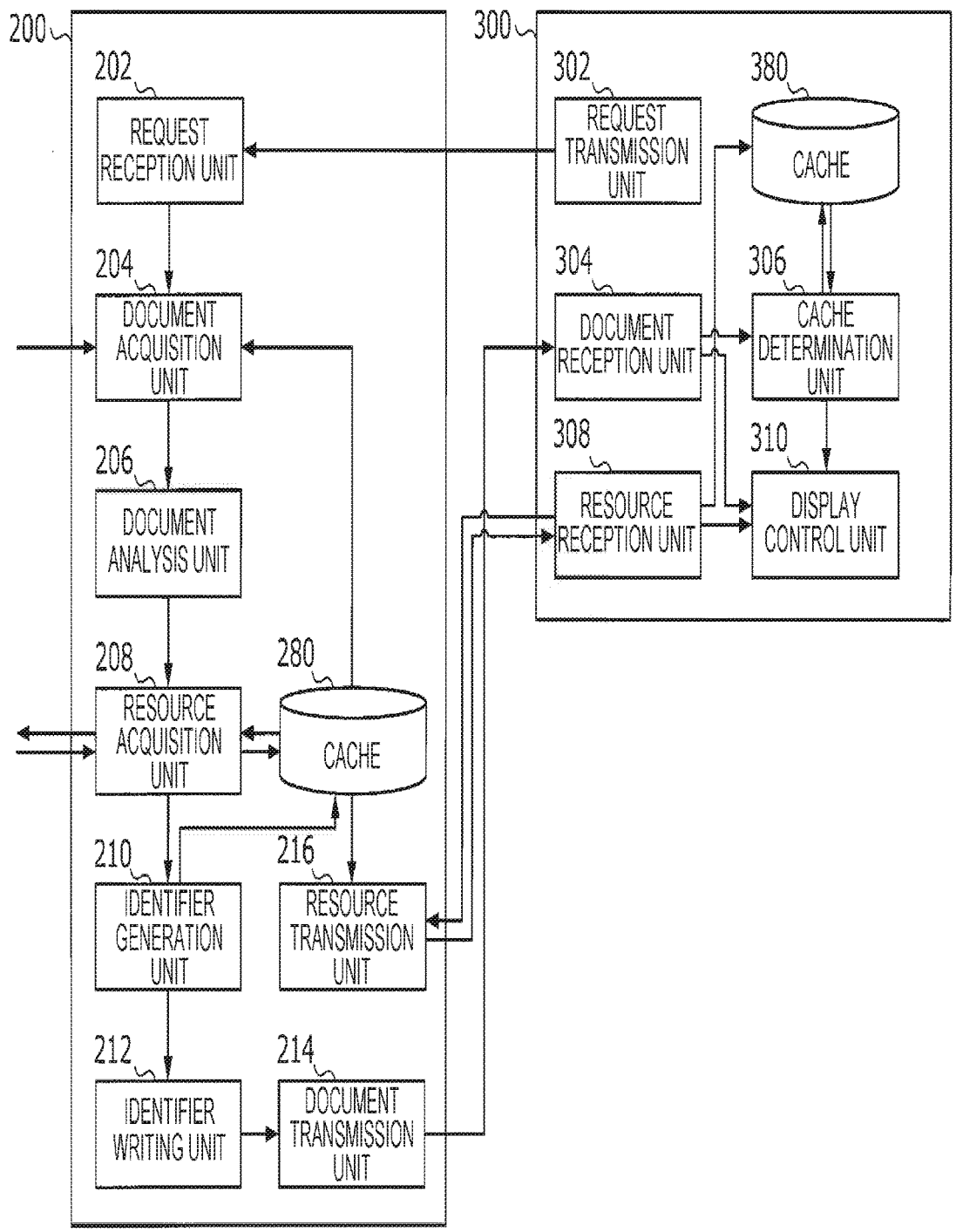
FIG. 2 is a block diagram showing a schematic function configuration of an intermediate server and a client according to Embodiment 1 of the present disclosure.

FIG. 2 is a block diagram showing a schematic function configuration of an intermediate server and a client according to Embodiment 1 of the present disclosure. When referring to FIG. 2, the intermediate server 200 includes, as a function configuration, a request reception unit 202, a document acquisition unit 204, a document analysis unit 206, a resource acquisition unit 208, an identifier generation unit 210, an identifier writing unit 212, a document transmission unit 214, and a resource transmission unit 216. The client 300 includes, as a function configuration, a request transmission unit 302, a document reception unit 304, a cache determination unit 306, a resource reception unit 308, and a display control unit 310.

For example, those function configurations can be realized by causing the processors included in the information processing devices that realize the intermediate server 200 and the client 300 to operate in accordance with programs stored in memories or recording media. A cache 280 in the intermediate server 200 and a cache 380 in the client 300 can be realized by, for example, storages or memories of the respective information processing devices.

(Intermediate Server)

In the intermediate server 200, the request reception unit 202 receives a request from the client 300. When the request is received, the document acquisition unit 204 acquires a document specified in the request in response to the request. At this time, the document acquisition unit 204 may internally acquire the document stored in the cache 280. In the case where the specified document is not stored in the cache 280, the document acquisition unit 204 transmits a request to the distribution source server 100 and acquires the document transmitted from the distribution source server 100 in response to the request.

The document analysis unit 206 analyzes the document acquired by the document acquisition unit 204. More specifically, the document analysis unit 206 detects a reference to a resource included in the document. In the case where the reference to the resource is detected by the document analysis unit 206, the resource acquisition unit 208 acquires the resource that is referred to. At this time, the resource acquisition unit 208 may internally acquire the resource stored in the cache 280. In the case where the resource that is referred to is not stored in the cache 280, the resource acquisition unit 208 transmits a request to the distribution source server 100 and acquires the resource transmitted from the distribution source server 100 in response to the request. The resource newly acquired from the distribution source server 100 is stored in the cache 280.

The identifier generation unit 210 generates an identifier unique to content of the resource acquired by the resource acquisition unit 208. For example, the identifier generation unit 210 may calculate a hash with a predetermined algorithm on the basis of the content of the resource. In this case, the calculated hash can be an identifier unique to the content of the resource. Note that the identifier generation unit 210 does not necessarily need to use a hash as an identifier as it is and may identify a resource on the basis of a hash and then separately generate an identifier to thereby add the identifier to the resource. The identifier generation unit 210 may associate the generated identifier with the resource stored in the cache 280.

More specifically, for example, the identifier generation unit 210 considers the resource to be binary data regardless of a type thereof and generates a unique identifier with the use of a hash function. As the hash function, for example, MD5, SHA-1, SHA-256, or the like may be used. Further, the identifier generation unit 210 may generate a plurality of identifiers for a single resource with the use of a plurality of hash functions. In the case where all those identifiers match, it is determined that resources are identical. This can further improve uniqueness of the identifiers.

As described below, it is possible to speed up display of a document in the client 300 by using an identifier that is unique to content of a resource and is generated by the identifier generation unit 210. As in the above example where an identifier is generated by using a hash function, it takes some time for the identifier generation unit 210 to generate a unique identifier. However, throughput of the intermediate server 200 is generally higher than that of the client 300, and display of a document can be started in the client 300 while an identifier is being generated as described in a modification example described below. As a result, display of the document is speeded up.

The identifier writing unit 212 associates the identifier generated by the identifier generation unit 210 with the reference to the resource in the document. More specifically, for example, the identifier writing unit 212 adds the identifier generated by the identifier generation unit 210 to an original identifier and associates the identifier with the reference to the resource. For example, an HTML document includes a reference to a resource having a uniform resource locator (URL) as an original identifier. In this case, the identifier writing unit 212 may additionally write an identifier generated by the identifier generation unit 210 such as a hash in the document while maintaining the URL serving as an original identifier.

As an example, in the case where a reference to a resource of an image including a URL shown in the following (a) is included in a HTML document, the identifier writing unit 212 may additionally write a hash (new_id) that is an identifier generated by the identifier generation unit 210 in the document as shown in (b).

(a)<img src="resource/image001.jpg"/>
(b)<img src="resource/image001.jpg" new_id="736f6e7920706174656e74"/>

As described below, the client 300 is configured to determine whether or not a cache of a resource exists on the basis of an identifier additionally written by the identifier writing unit 212 at the time of referring to a document and transmit a request for the resource to the intermediate server 200 in the case where the cache does not exist. However, a client other than the client 300, i.e., a client that does not refer to an identifier that is additionally written can exist in the network. When the identifier writing unit 212 maintains an original identifier, it is possible to secure backward compatibility with such a client.

Alternatively, the identifier writing unit 212 may overwrite the identifier generated by the identifier generation unit 210 on the original identifier included in the reference to the resource in the document. In this case, for example, the reference to the resource shown in the above (a) can be rewritten as shown in the following (c).

(c)<img src="http://www.xxx.yyy/zzz/736f6e7920706174656e74"/>

In this example, the identifier writing unit 212 rewrites the URL into an absolute pass indicating the intermediate server 200 and writes the identifier generated by the identifier generation unit 210 after the absolute pass. The absolute pass indicating the intermediate server 200 is added in common to all resources. Therefore, determination of presence/absence of a cache by the client 300 on the basis of an original identifier rewritten as in the above example is substantially the same as determination based on an identifier generated by the identifier generation unit 210. In this case, the client does not need to be configured to refer to an identifier that is additionally written.

The document transmission unit 214 transmits the document including the identifier generated by the identifier generation unit 210 to the client 300. As described below, the client 300 displays the document while referring to the resource on the basis of the identifier generated by the identifier generation unit 210. In the case where the resource referred to in the document is not cached in the client 300, the resource transmission unit 216 transmits the resource stored in the cache 280 to the client 300 in response to a request for the resource transmitted from the client 300.

(Client)

In the client 300, the request transmission unit 302 transmits a request to the intermediate server 200 on the basis of, for example, user operation. The document reception unit 304 receives a document transmitted by the intermediate server 200 in response to the request. As described above, the received document includes a reference to a resource, and the reference to the resource is associated with an identifier that is generated by the identifier generation unit 210 of the intermediate server 200 and is unique to content of the resource. As described above, the unique identifier may be added to an original identifier to be associated with the reference to the resource in the document.

The cache determination unit 306 determines whether or not the resource that is referred to in the document received by the document reception unit 304 is stored in the cache 380. At this time, the cache determination unit 306 determines whether or not the resource is stored in the cache 380 on the basis of the identifier unique to the content of the resource. In the case where the resource is stored in the cache 380, the cache determination unit 306 reads out the stored resource and provides the resource to the display control unit 310. On the contrary, in the case where the resource is not stored in the cache 380, the cache determination unit 306 requests the resource reception unit 308 to transmit a request for the resource to the intermediate server 200.

Herein, if the identifier used in determination by the cache determination unit is, for example, a URL, the identifier is not always unique to the content of the resource. Therefore, in some cases, it is determined that different resources are referred to even in the case where the resources have identical contents. For example, it is assumed that there are a first resource referred to by a first document distributed from a first distribution source server 100a and a second resource referred to by a second document distributed from a second distribution source server 100b. In this case, even in the case where the first resource and the second resource have identical content, a URL indicating the first distribution source server 100a and a URL indicating the second distribution source server 100b are different, and therefore identifiers (URLs) used in references to the first resource and the second resource are different. Accordingly, in the case where the second resource is referred to in the received second document, the cache determination unit may determine that the resource that is referred to is not stored in the cache unless the second resource itself is stored in the cache even though the first resource having the same content as that of the second resource has already been stored in the cache.

On the contrary, the cache determination unit 306 of the client 300 according to this embodiment determines whether or not the resource is stored in the cache 380 on the basis of the identifier unique to the content of the resource. In the above example, the identifier generation unit 210 of the intermediate server 200 generates an identifier common to the first resource and the second resource, and the cache determination unit 306 determines whether or not the resource is stored in the cache 380 on the basis of the common identifier. Therefore, in the case where the second resource is referred to in the received second document and the first resource having the same content as that of the second resource has already been stored in the cache 380, the cache determination unit 306 determines that the resource that is referred to is stored in the cache 38. This makes it possible to reuse the resource stored in the cache 380 and provide the resource to the display control unit 310 without transmitting a request to the intermediate server 200.

The resource reception unit 308 transmits the request for the resource to the intermediate server 200 and receives the resource transmitted from the intermediate server 200 in response to the request. The resource reception unit 308 provides the received resource to the display control unit 310. Further, the resource reception unit 308 stores the resource that is newly received in the cache 380.

The display control unit 310 displays the document on the display of the client 300 on the basis of the document received by the document reception unit 304 and the resource that is referred to in the document. As described above, the resource is read out from the cache 380 and is reused in accordance with determination of the cache determination unit 306 or is newly received from the intermediate server 200. Because it takes time for communication to receive the resource from the intermediate server 200, display of documents is speeded up as a ratio of reused resources is higher.

In this embodiment, the cache determination unit 306 determines whether or not a resource is stored in the cache 380 on the basis of an identifier unique to content of the resource. Therefore, for example, not only resources referred to in documents distributed from the same distribution source server 100 but also resources referred to in a plurality of documents, respectively, distributed from different distribution source servers 100 can be reused as long as contents thereof are identical. This can increase a ratio of resources reused when documents are displayed, and therefore display of the documents can be speeded up.

2-2. Processing Flow (Processing Flow of Intermediate Server)

Figure 3:
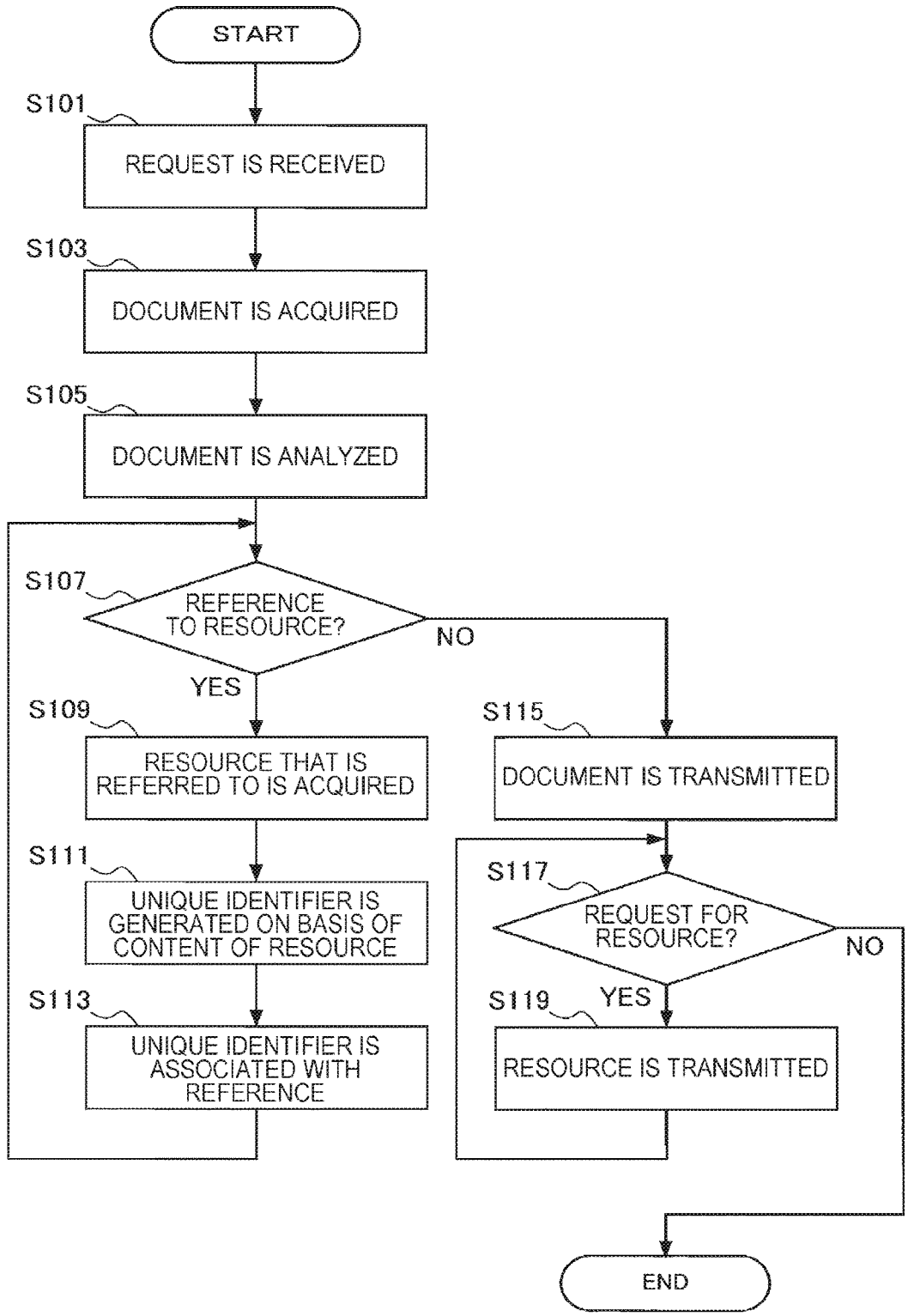
FIG. 3 is a flowchart showing processing of the intermediate server according to Embodiment 1 of the present disclosure.

FIG. 3 is a flowchart showing processing of the intermediate server according to Embodiment 1 of the present disclosure. When referring to FIG. 3, first, the request reception unit 202 receives a request from the client 300

(S101). Next, the document acquisition unit 204 acquires a document specified in the request (S103). Then, the document analysis unit 206 analyzes the acquired document (S105).

Herein, a reference to a resource is detected in analysis of the document (YES in S107), the resource acquisition unit 208 acquires the resource that is referred to (S109). Further, the identifier generation unit 210 generates a unique identifier on the basis of content of the acquired resource (S111). Then, the identifier writing unit 212 associates the generated unique identifier with the reference to the resource in the document (S113). S109 to S113 can be repeatedly executed until all references to resources in the document are detected.

In the case where a reference to a resource is no longer detected or no reference has been detected in analysis of the document (NO in S107), the document transmission unit 214 transmits the document to the client 300 (S115) Thereafter, in the case where a request for a resource is received from the client 300 (YES in S117), the resource transmission unit 216 transmits the resource to the client 300 (S119). In the case where a request for a resource is no longer received or no request has been received (NO in S117), processing in the intermediate server 200 is terminated.

(Processing Flow of Client)

Figure 4:
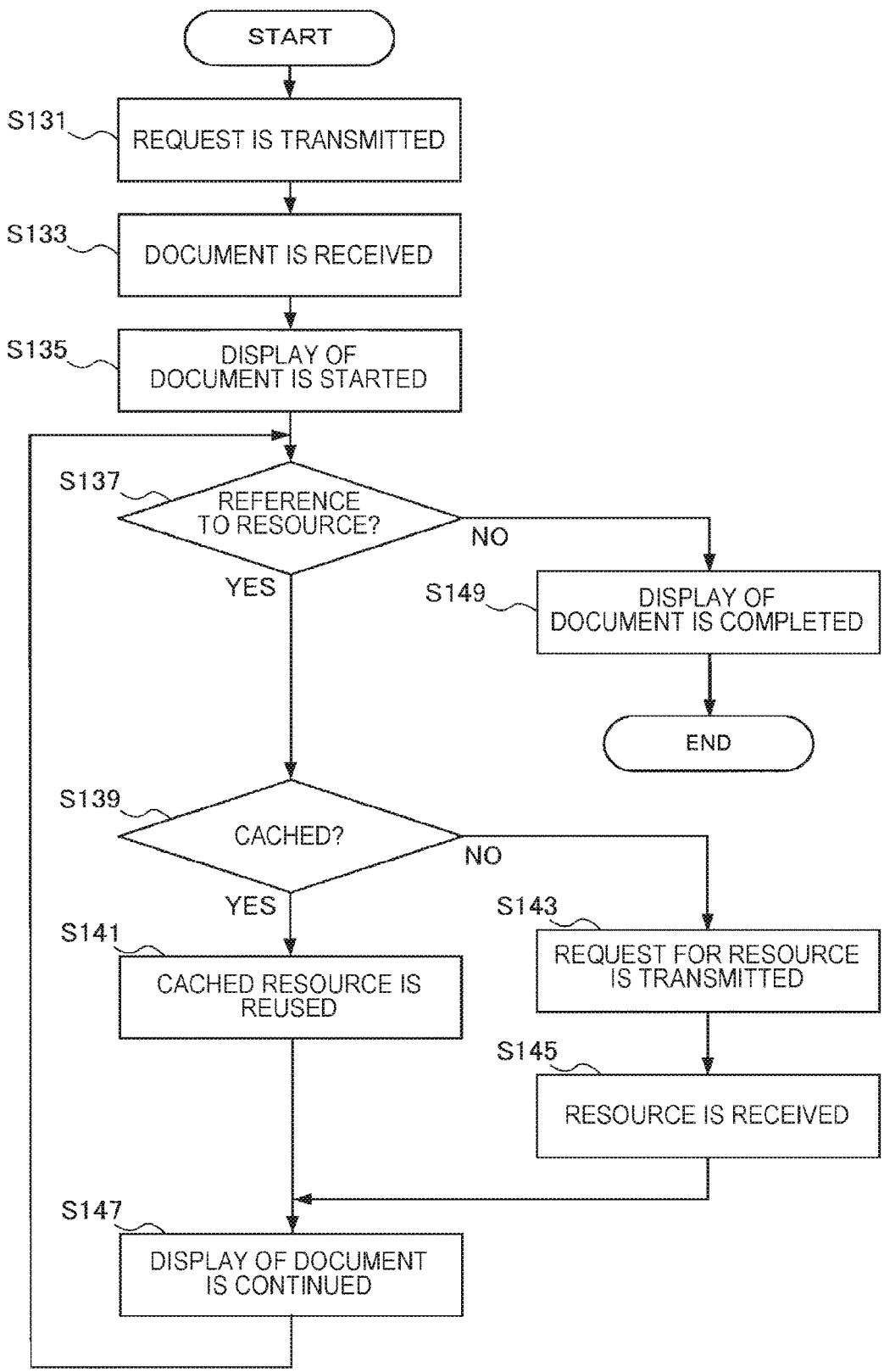
FIG. 4 is a flowchart showing processing of the client according to Embodiment 1 of the present disclosure.

FIG. 4 is a flowchart showing processing of the client according to Embodiment 1 of the present disclosure. When referring to FIG. 4, first, the request transmission unit 302 transmits a request to the intermediate server 200 (S131). Then, the document reception unit 304 receives a document transmitted by the intermediate server 200 in response to the request (S133). Herein, the display control unit 310 starts displaying the received document (S135).

In the case where a reference to a resource is found in the document (YES in S137), the cache determination unit 306 determines whether or not the resource that is referred to is stored (cached) in the cache 380 (S139). As described above, the cache determination unit 306 determines whether or not the resource is stored in the cache 380 on the basis of an identifier that is unique to content of the resource and is associated with the reference to the resource in the document.

Herein, in the case where it is determined that the resource is stored in the cache 380 (YES in S139), the cache determination unit 306 reads out the resource from the cache 380 and provides the resource to the display control unit 310. That is, the cache determination unit 306 and the display control unit 310 reuse the cached resource (S141). On the contrary, in the case where it is determined that the resource is not stored in the cache 380 (NO in S139), the resource reception unit 308 transmits a request for the resource to the intermediate server 200 (S143). The resource reception unit 308 receives the resource transmitted by the intermediate server 200 in response to the request (S145).

The display control unit 310 continues to display the document with reference to the reused resource or the resource received from the intermediate server 200 (S147) S139 to S147 can be repeatedly executed until all references to resources in the document are found. In the case where the display control unit 310 displays the whole document and a reference to a resource is no longer found or no reference to a resource has been found (NO in S137), the client 300 completes display of the document (S149).

2-3 Modification Example

Processing Flow of Intermediate Server

Figure 5:
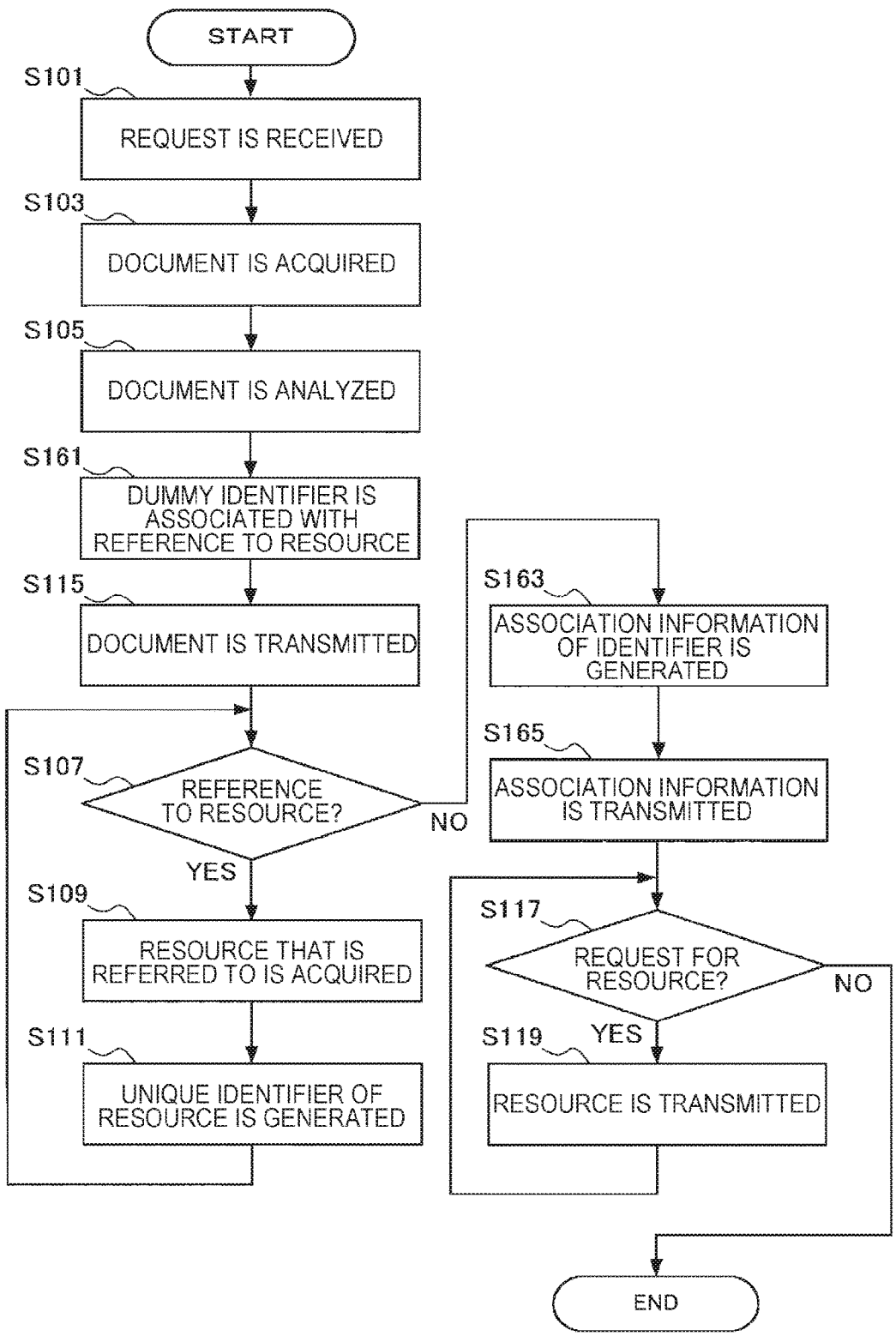
FIG. 5 is a flowchart showing processing of an intermediate server according to a modification example of Embodiment 1 of the present disclosure.

FIG. 5 is a flowchart showing processing of an intermediate server according to a modification example of Embodiment 1 of the present disclosure. When referring to FIG. 5, first, S101 to S105 are executed in the same way as S101 to S105 in the example described above with reference to FIG. 3.

Next, the identifier writing unit 212 associates dummy identifiers with references to resources detected by analysis of a document (S161). Herein, the dummy identifiers are, for example, a series of identifiers that are mechanically generated and are not necessarily unique to contents of the resources. The identifier writing unit 212 associates, for example, incremental or random dummy identifiers with detected references in order from the top of the document. At this time, in the case where original identifiers (e.g., URLs) of the resources that are referred to are identical, the identifier writing unit 212 may associate an identical dummy identifier with those references.

Then, the document transmission unit 214 transmits the document to the client 300 (S115). After that or along with this, for each of the references to the resources detected by analysis of the document, the resource acquisition unit 208 acquires the resource that is referred to, and the identifier generation unit 210 generates a unique identifier on the basis of content of the acquired resource (S107 to S111).

In the case where processing in S107 to S111 for all the detected references is terminated, the identifier writing unit 212 generates information (association information on identifiers) that associates the dummy identifiers associated with the references in S161 and the unique identifiers generated in S111 with each other (S163). The document transmission unit 214 transmits the association information on the identifiers to the client 300 (S165). Thereafter, in the case where a request for a resource is received from the client 300, the resource transmission unit 216 transmits the resource to the client 300 (S117, S119).

(Processing Flow of Client)

Figure 6:
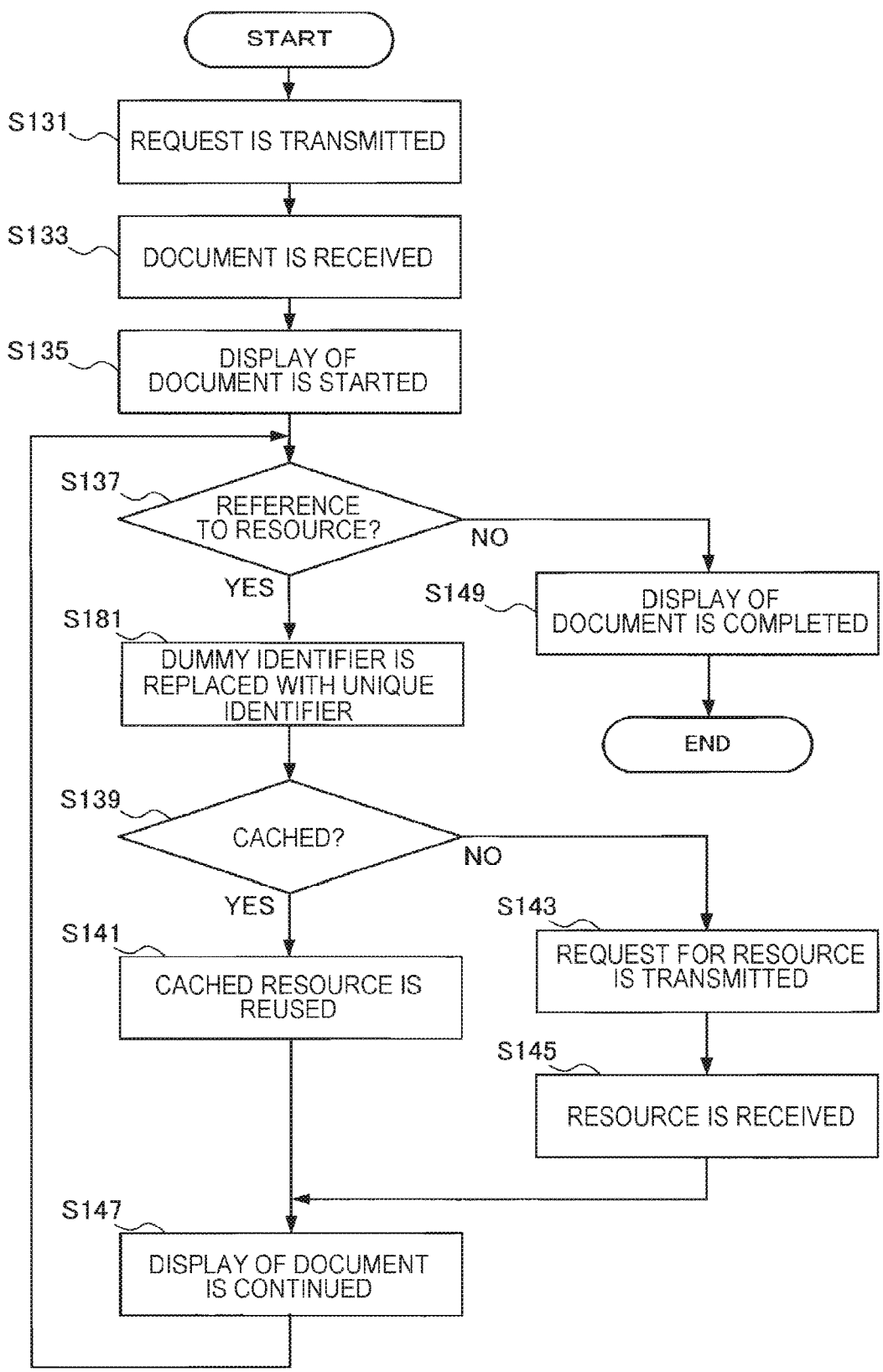
FIG. 6 is a flowchart showing processing of a client according to the modification example of Embodiment 1 of the present disclosure.

FIG. 6 is a flowchart showing processing of the client according to the modification example of Embodiment 1 of the present disclosure. When referring to FIG. 6, first, S131 to S135 are executed in the same way as S131 to S135 in the example described above with reference to FIG. 4.

In the case where a reference to a resource is found in a document (YES in S137), the cache determination unit 306 replaces a dummy identifier associated with the found reference with a unique identifier (S181) and determines whether or not the resource that is referred to is stored in the cache 380 (S139). Although not shown, in the case where the association information on the above identifiers is not received by the document reception unit 304 in S181, i.e., in the case where the cache determination unit 306 refers to the resource in a state in which the dummy identifier is associated with the reference to the resource, the cache determination unit 306 transmits a request for the identifier or association information on the identifier to the intermediate server 200. In this case, regarding the reference whose request is received, the identifier generation unit 210 of the intermediate server 200 may preferentially generate a unique identifier based on content of the resource that is referred to.

Even in the case where throughput of the intermediate server 200 is higher than that of the client 300, it takes some time for the identifier generation unit 210 to generate a unique identifier. As in this modification example, a document in which a dummy identifier that can be easily generated is associated with a reference is precedently transmitted to the client 300 and a unique identifier is generated in the intermediate server 200 while display is started on the basis of the document received in the client 300, and therefore it is possible to further reduce a time to complete display of a document in the client 300.

3. Embodiment 2

3-1. Function Configuration

Figure 7:
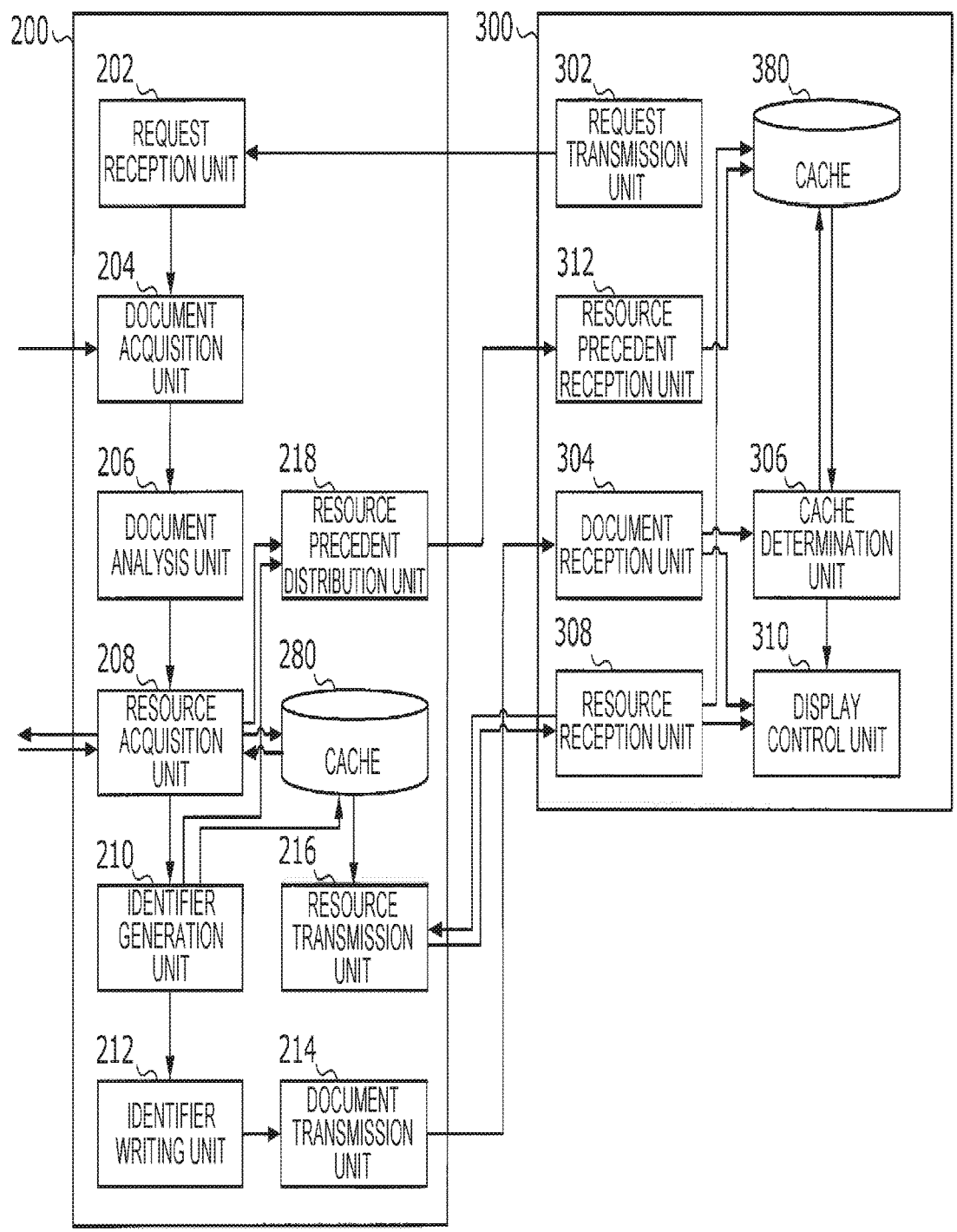
FIG. 7 is a block diagram showing a schematic function configuration of an intermediate server and a client according to Embodiment 2 of the present disclosure.

FIG. 7 is a block diagram showing a schematic function configuration of an intermediate server and a client according to Embodiment 2 of the present disclosure. When referring to FIG. 7, the intermediate server 200 further includes a resource precedent distribution unit 218 as a function configuration. The client 300 further includes a resource precedent reception unit 312 as a function configuration.

The resource precedent distribution unit 218 of the intermediate server 200 precedently transmits a predetermined resource to the client 300 before the request reception unit 202 receives a request from the client 300. At this time, the resource precedent distribution unit 218 associates the resource with an identifier unique to content of the resource generated by the identifier generation unit 210 and transmits the resource to the client 300.

For example, the resource precedent distribution unit 218 may count the number of association of an identifier generated by the identifier generation unit 210 with a reference to a resource in documents and transmit, to the client 300, the resource estimated to be frequently used on the basis of this number. Because an identifier generated by the identifier generation unit 210 is unique to content of a resource, the above count can be count indicating a frequency at which each resource is referred to in various documents on the basis of contents of the resources regardless of URLs thereof and the like.

Alternatively, the resource precedent distribution unit 218 may precedently transmit a resource specified by a service provider to the client 300. For example, the resource precedent distribution unit 218 precedently transmits a standard library of a script expected to be referred to in common by a large number of documents to the client 300 in accordance with setting performed by the service provider. Therefore, in the case where a document is provided, it is possible to save a time to transmit a request for a script and a time to transmit the script in response to the request.

In the case where a resource that is precedently distributed is a program such as a script, the resource precedent distribution unit 218 may transmit the program to the client 300 after precompiling the program. For example, in the case where the client 300 compiles a program referred to in a document and then executes the program, a time for compilation is limited even in the case where the program is stored in the cache 380. On the contrary, in the case where the resource precedent distribution unit 218 precompiles a program in the intermediate server 200 before transmitting the program to the client 300, it is possible to have an enough time to perform compilation. Therefore, optimization can be satisfactorily achieved by operation compilation at the time of executing the program.

The resource precedent reception unit 312 of the client 300 receives a resource transmitted by the resource precedent distribution unit 218 of the intermediate server 200 before the request transmission unit 302 transmits a request to the intermediate server 200. Herein, the received resource may be, for example, a resource estimated to be frequently used on the basis of the number of association with a reference to the resource or a resource specified by a service provider as described above. In any case, the resource precedent reception unit 312 receives a resource precedently distributed from the intermediate server 200 and stores the received resource in the cache 380.

As described above, the received resource is associated with an identifier that is unique to content of the resource and is generated by the identifier generation unit 210 in the intermediate server 200. The resource precedent reception unit 312 stores the received resource associated with this identifier in the cache 380. With this, in the case where a resource whose content is identical with that of a resource that is precedently distributed is referred to in a document, the resource stored in the cache 380 in advance is used regardless of an original identifier (e.g., URL) of the resource that is precedently distributed. This makes it possible to speed up display of the document.

In the case where a resource that is precedently distributed is a program such as a script, the resource precedent reception unit 312 may receive a program precompiled by the resource precedent distribution unit 218 of the intermediate server 200. In this case, the resource precedent reception unit 312 may store the precompiled program in a storage area that is different from a storage area for resources other than the program, such as an image and CSS, in the cache 380. The precompiled program can be stored in a storage area in common with a library such as WebCore. With this, when a document is displayed in the client 300, it is possible to access a precompiled program corresponding to a resource that is referred to at a higher speed.

In terms of a ratio of a size of a resource that is referred to in, for example, an HTML document, a ratio of a script such as JavaScript is the largest next to a ratio of an image. Further, when, for example, JavaScript is referred to, some specific standard libraries are referred to in most cases. Therefore, when, for example, a standard library of a script is distributed to the client 300 from the intermediate server 200 in advance, it is possible to omit transmission and reception of a request for a standard library of a script and a resource which are generated with a high probability when the document is displayed, thereby speeding up display of the document.

More specifically, in the case where a script is updated and the updated script is distributed to the client 300 from the intermediate server 200 before a request, it is possible to use the script stored in the cache of the client 300 to quickly display a document even in the case where the script is referred to from the document for the first time after updating. In the above case, when a standard library of the script is precompiled, it is possible to further speed up display thereof as described above. Distribution of resources to the client 300 from the intermediate server 200 in advance, the resources being estimated to be referred to with a high probability when a document is displayed such as an image of a logo and an image of a topical item, in addition to the script, can contribute to speeding up of display of the document.

3-2. Processing Flow (Processing Flow of Intermediate Server)

Figure 8:
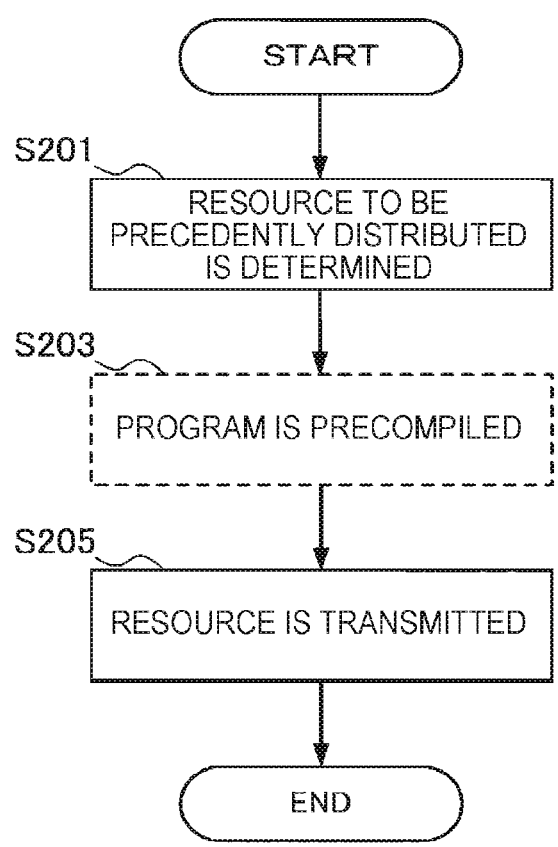
FIG. 8 is a flowchart showing processing before the intermediate server according to Embodiment 2 of the present disclosure receives a request.

FIG. 8 is a flowchart showing processing before the intermediate server according to Embodiment 2 of the present disclosure receives a request. When referring to FIG. 8, first, the resource precedent distribution unit 218 determines a resource to be precedently distributed (S201). Herein, the resource to be precedently distributed may be determined on the basis of, for example, the number of association of an identifier with a reference to a resource in documents or may be specified by a service provider as described above.

The resource precedent distribution unit 218 may regularly request a resource that is estimated to be frequently used and may be updated, such as the standard library of the script described above, from the distribution source server 100 to check presence/absence of update thereof. In the case where the update is presence, the resource precedent distribution unit 218 may determine to precedently distribute the updated resource. The resource precedent distribution unit 218 may use generation processing of an identifier performed by the identifier generation unit 210 in order to check presence/absence of the update. That is, in the case where, when the identifier generation unit 210 generates an identifier unique to content of a resource, the generated identifier is different from an identifier that has been generated before, it is possible to determine that the resource has been updated.

Then, in the case where the resource to be precedently distributed is a program, the resource precedent distribution unit 218 executes precompilation as additional processing as necessary (S203). Next, the resource precedent distribution unit 218 transmits the resource to the client 300 (S205).

(Processing Flow of Client)

Figure 9:
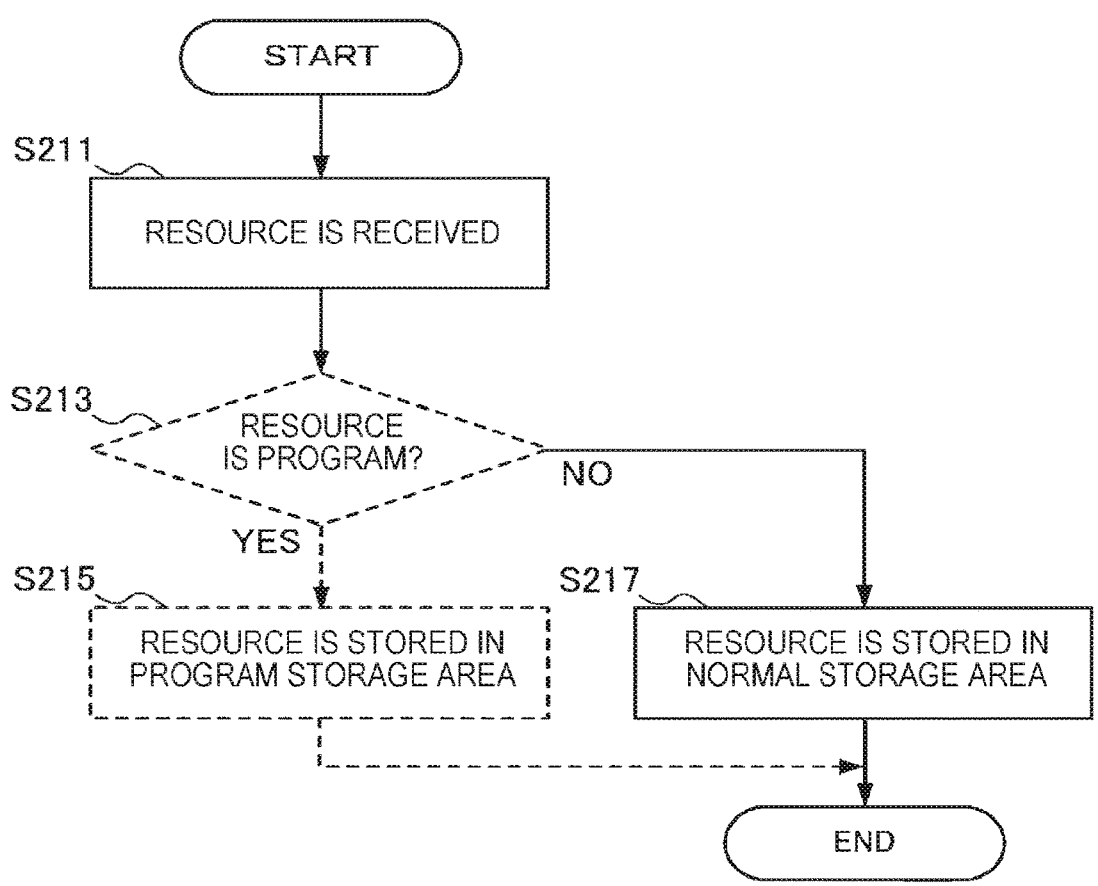
FIG. 9 is a flowchart showing processing before the client according to Embodiment 2 of the present disclosure transmits a request.

FIG. 9 is a flowchart showing processing before the client according to Embodiment 2 of the present disclosure transmits a request. When referring to FIG. 9, first, the resource precedent reception unit 312 receives a resource distributed from the intermediate server 200 (S211). Then, as additional processing, in the case where the resource that is precedently distributed is a program (YES in S213), the resource precedent reception unit 312 stores the distributed resource in a program storage area that is different from a storage area for other resources (S215). If the resource is not a program, the resource precedent reception unit 312 stores the resource in a normal storage area in the cache 380 (S217).

Note that the processing flows of the intermediate server and the client after transmitting a request are similar to those in Embodiment 1 described above, and therefore detailed description thereof is omitted. In this embodiment, part of a resource is transmitted to the client 300 from the intermediate server 200 before a request is transmitted as described above, and therefore the resource is determined to be stored in the cache 380 more frequently in, for example, S139 in the flowchart of FIG. 4.

4. Embodiment 3

4-1. Function Configuration

Figure 10A:
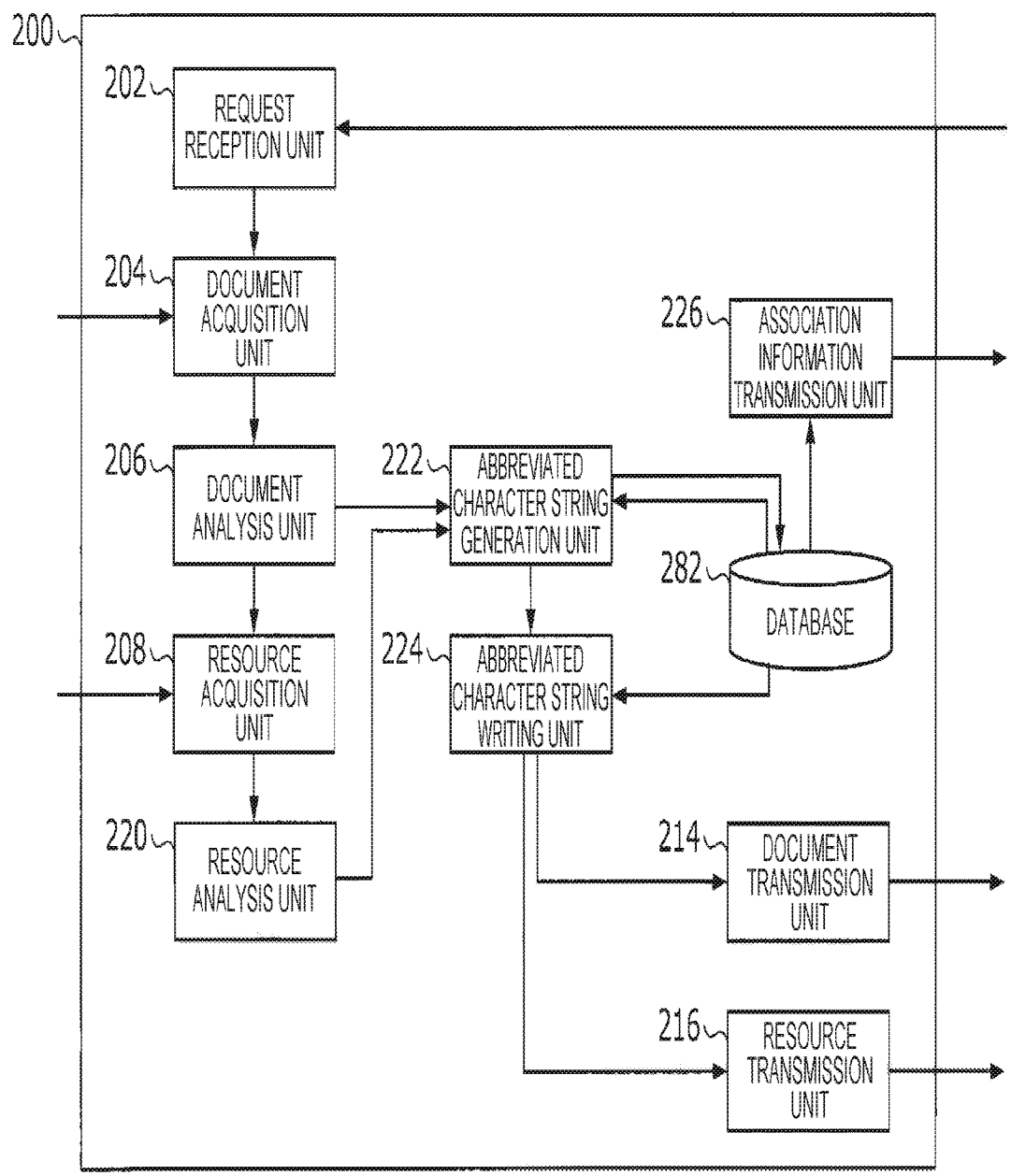
FIG. 10A is a block diagram showing a schematic function configuration of an intermediate server according to Embodiment 3 of the present disclosure.
Figure 10B:
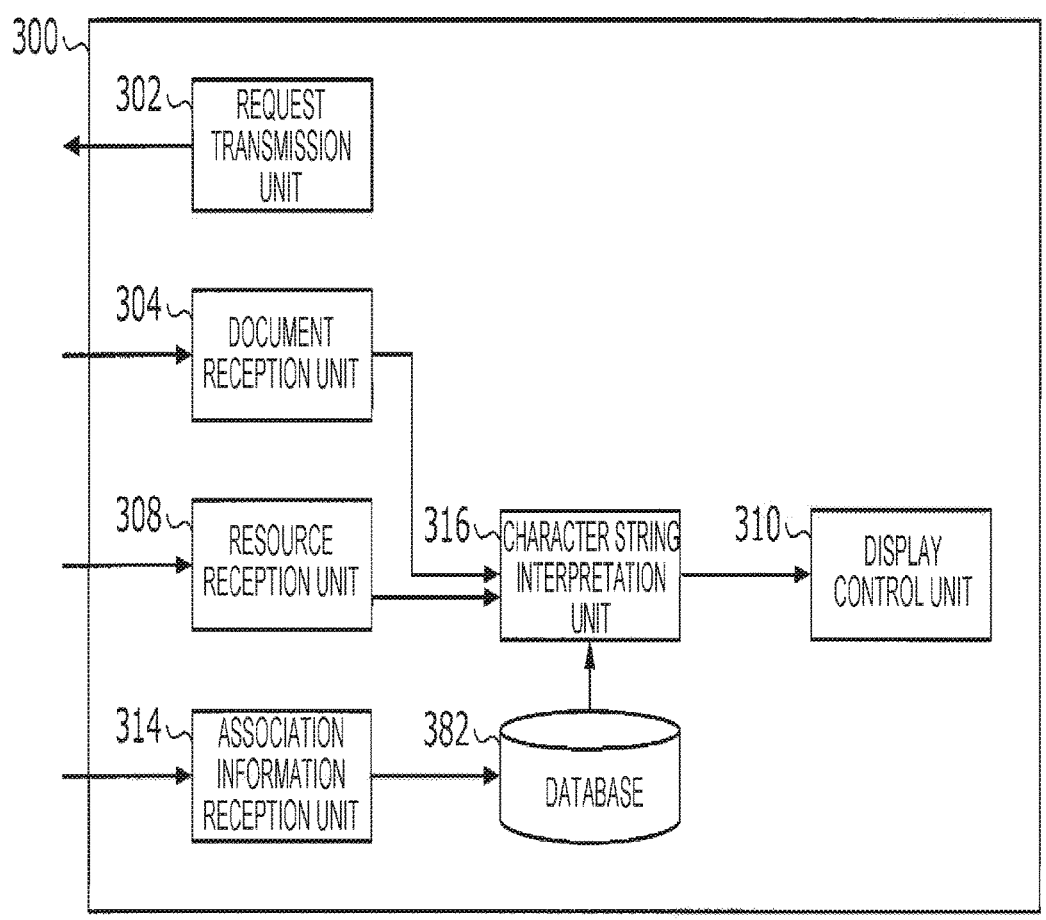
FIG. 10B is a block diagram showing a schematic function configuration of a client according to Embodiment 3 of the present disclosure.

FIG. 10 (FIG. 10A and FIG. 10B) is block diagrams showing schematic function configurations of an intermediate server and a client according to Embodiment 3 of the present disclosure. When referring to FIG. 10A, the intermediate server 200 includes, as a function configuration, the request reception unit 202, the document acquisition unit 204, the document analysis unit 206, the resource acquisition unit 208, a resource analysis unit 220, an abbreviated character string generation unit 222, an abbreviated character string writing unit 224, the document transmission unit 214, an association information transmission unit 226, and the resource transmission unit 216. When referring to FIG. 10B, the client 300 includes, as a function configuration, the request transmission unit 302, the document reception unit 304, the resource reception unit 308, an association information reception unit 314, a character string interpretation unit 316, and the display control unit 310.

For example, those function configurations can be realized by causing the processors included in the information processing devices that realize the intermediate server 200 and the client 300 to operate in accordance with programs stored in memories or recording media. A database 282 in the intermediate server 200 and a database 382 in the client 300 can be realized by, for example, storages or memories of the respective information processing devices.

(Intermediate Server)

In the intermediate server 200, the request reception unit 202 and the document acquisition unit 204 acquire a document in response to a request from the client 300 in the same way as the request reception unit 202 and the document acquisition unit 204 in Embodiment 1 described above. Further, the document analysis unit 206 analyzes the document acquired by the document acquisition unit 204 and detects a reference to a resource included in the document. In the case where the reference to the resource is detected by the document analysis unit 206, the resource acquisition unit 208 acquires the resource that is referred to.

Further, in this embodiment, the document analysis unit 206 detects a character string that can be abbreviated and is included in the document acquired by the document acquisition unit 204. The resource analysis unit 220 detects a character string that can be abbreviated and is included in the resource acquired by the resource acquisition unit 208. Herein, examples of the character strings that can be abbreviated encompass arbitrary identifiers applied to an element in the document, a class defined by a style, a function defined by a program, and the like. Examples of the character strings that can be abbreviated may further encompass reserved words in formats of the document and the resource. Examples of the character strings that can be abbreviated may further encompass an identifier of the resource that is referred to in the document and a character string written in the document as a so-called descriptive sentence.

In the case where the character strings that can be abbreviated are detected by the document analysis unit 206 and the resource analysis unit 220, the abbreviated character string generation unit 222 generates character strings obtained by abbreviating the detected character strings (hereinafter, also referred to as "abbreviated character strings"). For example, the abbreviated character string generation unit 222 may generate an abbreviated character string by executing calculation in accordance with a predetermined algorithm on the basis of an original character string. As described below, in the example shown in FIG. 10, the algorithm may be irreversible because a relationship between the original character string and the abbreviated character string is recorded in the database 282. Alternatively, the abbreviated character string generation unit 222 may generate incremental or random abbreviated character strings regardless of original character strings.

Herein, in the case where an abbreviated character string is generated by using an algorithm in the above example, the abbreviated character string is slightly longer. However, the same abbreviated character string is automatically generated with respect to the same original character string, and therefore it is possible to improve searchability while reducing a record of the database 282 as small as possible. Further, depending on an algorithm to be used, it is possible to generate an abbreviated character string unique to an original character string.

Meanwhile, in the case where incremental or random abbreviated character strings are generated, the abbreviated character strings can be reduced to the utmost limit (e.g., to have a shortest length that can express the number of character strings that can be abbreviated and are included in the document or the resource). However, records corresponding to the number of character strings that can be abbreviated (including repetitious character strings) are generated in the database 282 if nothing is done. When the abbreviated character string generation unit 222 refers to the database 282 and generates a new abbreviated character string in the case where an abbreviated character string of the same original character string has not been generated, it is possible to reduce the number of records in the database 282.

In the case where the abbreviated character string is generated, the abbreviated character string generation unit 222 adds, to the database 282, a record (abbreviated character string record) that associates the original character string and the abbreviated character string with each other. The database 282 may be generated by using, for example, a document as a unit. That is, association of the original character string with the abbreviated character string, which is indicated by the database 282, may be performed by using a document transmitted in response to a single request and a resource referred to from this document as scopes. Alternatively, the database 282 may be generated by using a plurality of documents and resources referred to from those documents as scopes.

Herein, in the case where it has already been found that association of the generated abbreviated character string with the original character string is recorded in the database 382 of the client 300, the abbreviated character string generation unit 222 does not need to add the abbreviated character string record to the database 282. For example, in the case where reserved words in formats of a document and a resource are treated as character strings that can be abbreviated, the reserved words are limited, and therefore it is possible to allot abbreviated character strings in advance and record association of the reserved words with the abbreviated character strings in advance in the database 282 and the database 382. In this case, the abbreviated character string generation unit 222 generates an abbreviated character string allotted in advance with reference to the database 282 with respect to a reserved word detected in a document or a resource and then omits addition of a new record to the database 282.

The abbreviated character string writing unit 224 replaces the original character strings included in the document and the resource with the abbreviated character strings generated by the abbreviated character string generation unit 222. In order to reduce an amount of data to be transmitted and reduce a processing amount for reading character strings in the client 300, the abbreviated character string writing unit 224 is desired to replace the original character strings in the document and the resource with the abbreviated character strings instead of maintaining the original character strings.

The document transmission unit 214 transmits the document including the abbreviated character string generated by the abbreviated character string generation unit 222 (i.e., the document in which the original character string has been replaced with the abbreviated character string) to the client 300. Similarly, the resource transmission unit 216 transmits, to the client 300, the resource in which the original character string has been replaced with the abbreviated character string. The association information transmission unit 226 generates information that associates the original character string and the abbreviated character string with each other (hereinafter, also referred to as "association information") on the basis of the abbreviated character string record of the database 282 and transmits the information to the client 300.

Herein, the association information transmission unit 226 may transmit the association information to the client 300 only in the case where the original character string needs to be restored from the abbreviated character string in the client 300. That is, the association information does not need to include at least part of abbreviated character string records.

For example, in the case where the abbreviated character string generation unit 222 generates an abbreviated character string of an arbitrary identifier applied to an element in a document, a class defined by a style, a function defined by a program, or the like and the abbreviated character string is generated so that an original character string and the abbreviated character string have one-to-one correspondence via the document and a resource (e.g., the abbreviated character string is generated on the basis of the original character string in accordance with a predetermined algorithm, or, when the database 282 is referred to and the abbreviated character string of the original character string has already been generated, the abbreviated character string is reused), the element, the class, or the function is uniquely specified even in the case where the original character string is not restored in the client 300. In such a case, the association information transmission unit 226 does not need to transmit association information on the abbreviated character string to the client 300.

For example, in the case where an abbreviated character string of a reserved word in a document or a resource is generated, the database 282 includes an abbreviated character string record corresponding to the abbreviated character string corresponding to the reserved word in advance, whereas association information to be transmitted to the client 300 does not need to contain information on the reserved word (in the case where the information on the reserved word is stored in advance in the database 382 of the client 300).

On the contrary, in the case where an abbreviated character string is generated with respect to the element, the class, the function, or the like but is not in one-to-one correspondence with an original character string (e.g., in the case where the abbreviated character string generation unit 222 generates an abbreviated character string without referring to the database 282 and stores, in the database, information on the abbreviated character string that is mechanically allotted) or in the case where an original character string is finally presented to a user as in the case of a character string that is written in a document as a descriptive sentence, the association information transmission unit 226 transmits association information generated on the basis of a record of the database 282 to the client 300.

(Client)

In the client 300, the request transmission unit 302 and the document reception unit 304 transmit a request to the intermediate server 200 and receive a document transmitted by the intermediate server 200 in response to the request in the same way as the request transmission unit 302 and the document reception unit 304 in Embodiment 1 described above. The resource reception unit 308 receives a resource transmitted from the intermediate server 200. The received document and resource are provided to the character string interpretation unit 316. Further, in this embodiment, the association information reception unit 314 receives association information transmitted from the association information transmission unit 226 of the intermediate server 200. The association information reception unit 314 generates an abbreviated character string record in the database 382 on the basis of the received association information.

The character string interpretation unit 316 interprets abbreviated character strings included in the document and the resource with reference to the database 382. Herein, the character string interpretation unit 316 does not need to rewrite the abbreviated character strings into original character strings. In this embodiment, the character string interpretation unit 316 can interpret the abbreviated character strings included in the document and the resource as they are with reference to the database 382 and the display control unit 310 can display the document on the basis of the interpretation.

Note that, as described above, abbreviated character strings that are not included in the association information received by the association information reception unit 314 are also included in the document and the resource received in the client 300. For example, in the case where association of an abbreviated character string with a reserved word in a format of the document or the resource is recorded in the database 382 in advance, the abbreviated character string corresponding to the reserved word is not included in the association information received by the association information reception unit 314.

For example, in the case where an abbreviated character string of an arbitrary identifier applied to an element in the document, a class defined by a style, a function defined by a program, or the like is generated so that an original character string and the abbreviated character string have one-to-one correspondence via the document and the resource, information corresponding to the abbreviated character string is not included in the association information and does not need to be included in the database 382. In this case, the abbreviated character string is treated in the same way as a normal character string in the client 300, and the display control unit 310 directly interprets this abbreviated character string to display the document.

4-2. Processing Flow (Processing Flow of Intermediate Server)

Figure 11:
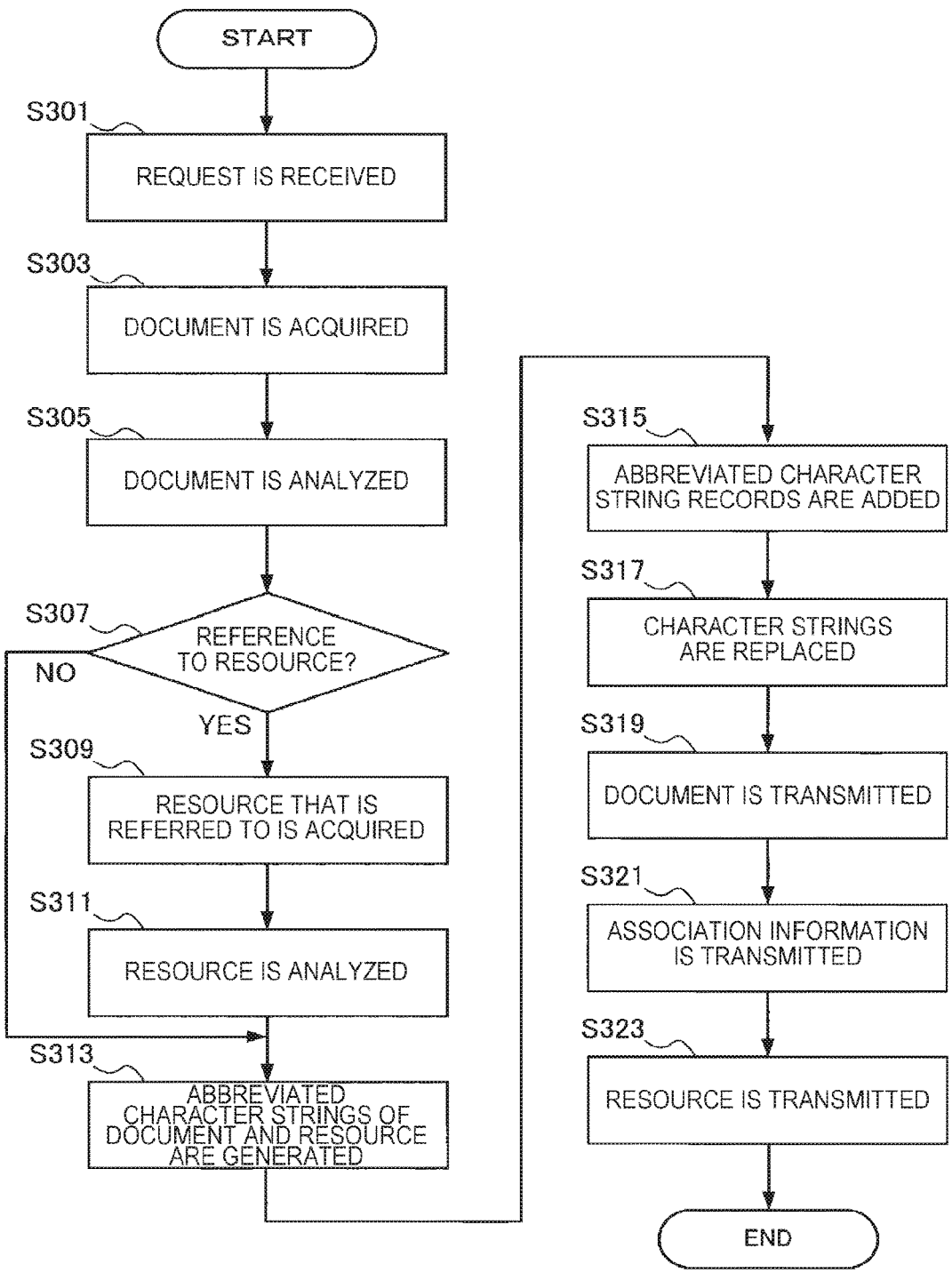
FIG. 11 is a flowchart showing processing of the intermediate server according to Embodiment 3 of the present disclosure.

FIG. 11 is a flowchart showing processing of the intermediate server according to Embodiment 3 of the present disclosure. When referring to FIG. 11, first, the request reception unit 202 receives a request from the client 300 (S301). Next, the document acquisition unit 204 acquires a document specified in the request (S303). Then, the document analysis unit 206 analyzes the acquired document (S305).

Herein, in the case where a reference to a resource is detected in analysis of the document (YES in S307), the resource acquisition unit 208 acquires the resource that is referred to (S309), and the resource analysis unit 220 analyzes the acquired resource (S311). Thereafter, the abbreviated character string generation unit 222 generates abbreviated character strings of character strings that are detected in the document and the resource and can be abbreviated (S313). At this time, the abbreviated character string generation unit 222 adds, to the database 282, abbreviated character string records in which original character strings and the abbreviated character strings are associated with each other (S315).

Further, the abbreviated character string writing unit 224 replaces the original character strings included in the document and the resource with the abbreviated character strings generated in the abbreviated character string generation unit 222 (S317). When replacement of the original character strings in the document is completed, the document transmission unit 214 transmits the document including the abbreviated character string to the client 300 (S319). Before or after this or along with this, the association information transmission unit 226 transmits, to the client 300, association information generated on the basis of the records in the database 382 (S321). Further, the resource transmission unit 216 transmits the resource including the abbreviated character string to the client 300 (S323).

(Processing Flow of Client)

Figure 12:
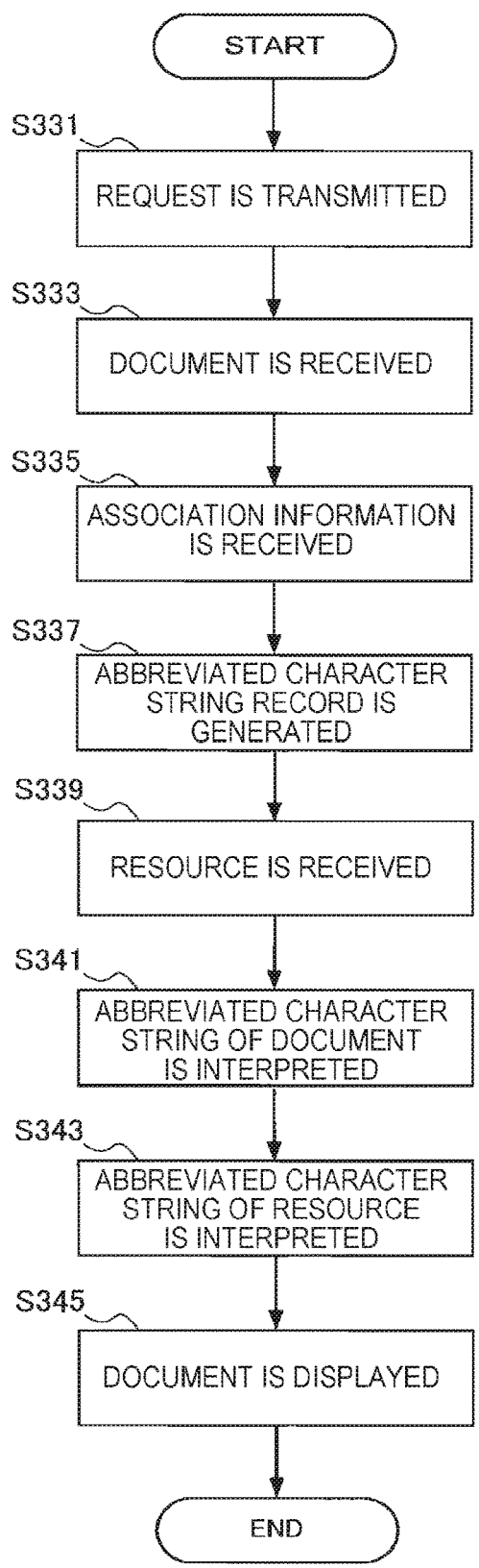
FIG. 12 is a flowchart showing processing of the client according to Embodiment 3 of the present disclosure.

FIG. 12 is a flowchart showing processing of the client according to Embodiment 3 of the present disclosure. When referring to FIG. 12, first, the request transmission unit 302 transmits a request to the intermediate server 200 (S331). Then, the document reception unit 304 receives a document including an abbreviated character string, which is transmitted by the intermediate server 200 in response to the request (S333). Before or after this or along with this, the association information reception unit 314 receives association information transmitted from the intermediate server 200 (S335). The association information reception unit 314 generates a record in the database 382 on the basis of the received association information (S337). Further, the resource reception unit 308 receives a resource including an abbreviated character string, which is transmitted by the intermediate server 200 (S339).

When the document is received in S333 and the abbreviated character string record is generated in the database 382 in S337, the character string interpretation unit 316 interprets the abbreviated character string included in the document with reference to the database 382 (S341). Note that processing in S341 may be executed along with, for example, processing in S339. The character string interpretation unit 316 also interprets the abbreviated character string of the resource that is referred to in the document, which is received in S339, with reference to the database 382 (S343). The display control unit 310 displays the document with the use of results obtained by the character string interpretation unit 316 interpreting the abbreviated character strings included in the document and the resource (S345).

In this embodiment, in the intermediate server 200, the abbreviated character string generation unit 222 adds, to the database 282, a record in which an original character string and an abbreviated character string are associated with each other. With this, for example, when the abbreviated character string is generated, the database 382 is referred to so that the original character string and the abbreviated character string can have one-to-one correspondence via the document and the resource. In this case, even in the case where the association information is not transmitted to the client 300, the client 300 can interpret the abbreviated character strings written in the document and the resource to thereby display the document in which the resource is referred to.

Alternatively, in the intermediate server 200, the association information transmission unit 226 may generate association information that associates abbreviated character strings generated in the document and the resource and original character strings with each other on the basis of the records of the database 282 to thereby transmit the association information to the client 300. In this case, for example, even in the case where the original character strings and the abbreviated character strings do not have one-to-one correspondence when the abbreviated character strings are generated, the client 300 can interpret the abbreviated character strings written in the document and the resource to thereby display the document in which the resource is referred to.

4-3. Modification Example

Processing Flow of Intermediate Server

Figure 13:
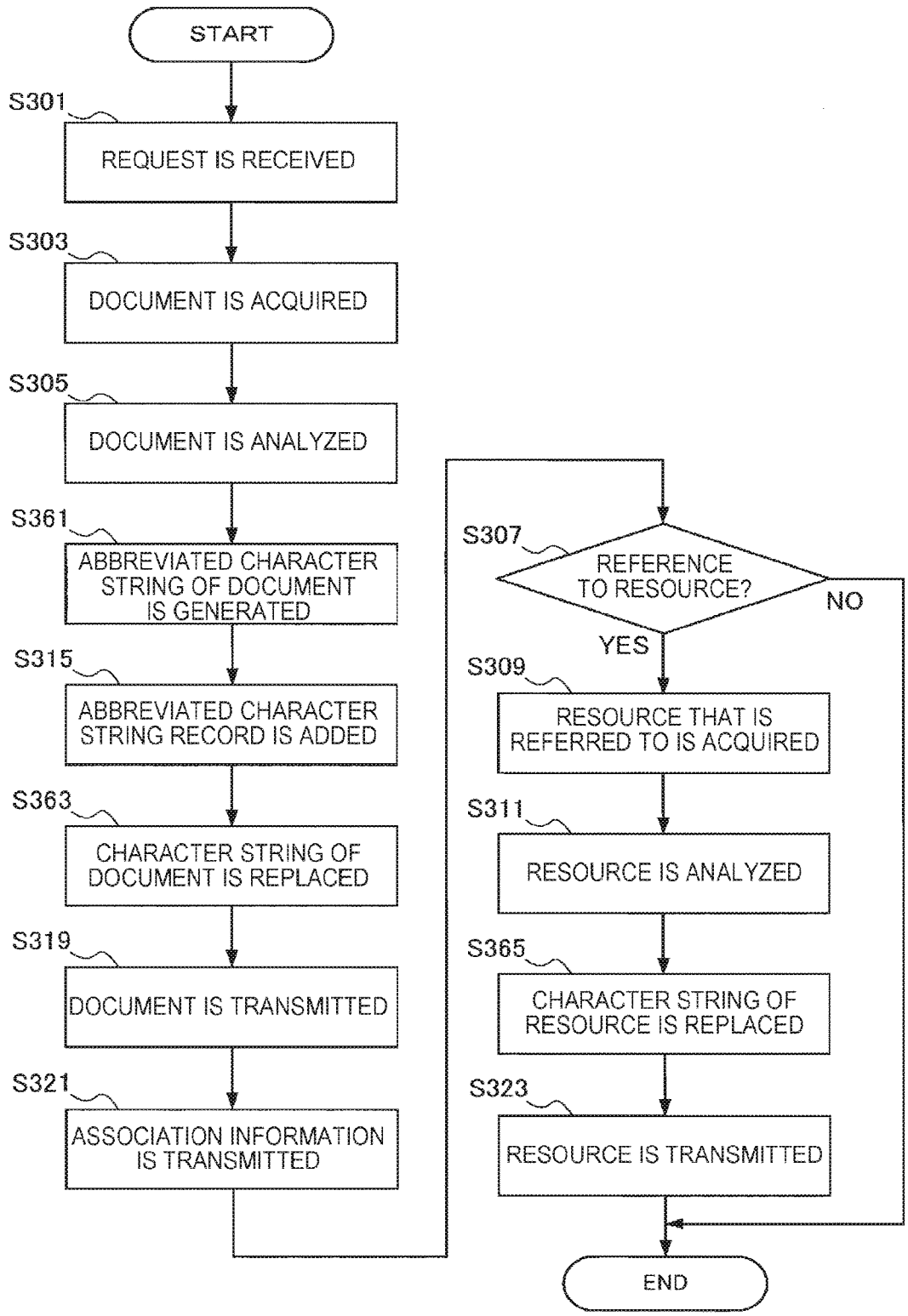
FIG. 13 is a flowchart showing processing of an intermediate server according to a modification example of Embodiment 3 of the present disclosure.

FIG. 13 is a flowchart showing processing of an intermediate server according to a modification example of Embodiment 3 of the present disclosure. When referring to FIG. 13, first, S101 to S105 are executed in the same way as S301 to S305 in the example described above with reference to FIG. 11.

In this modification example, the abbreviated character string generation unit 222 precedently generates an abbreviated character string of a character string that is detected in a document and can be abbreviated (S361). At this time, the abbreviated character string generation unit 222 adds, to the database 282, a record in which an original character string and the abbreviated character string are associated with each other (S315). Further, the abbreviated character string writing unit 224 replaces the character string included in the document with the abbreviated character string in accordance with the record in the database 282 (S363). When replacement is completed, the document transmission unit 214 transmits the document including the abbreviated character string to the client 300 (S319). Before or after transmission of the document or along with this, the association information transmission unit 226 transmits, to the client 300, association information generated on the basis of the record in the database 282 (S321).

In the case where a reference to a resource is detected in analysis of the document (YES in S307) after transmission of the document and the association information or along with this, the resource acquisition unit 208 acquires the resource that is referred to (S309), and the resource analysis unit 220 analyzes the acquired resource (S311) Thereafter, the abbreviated character string writing unit 224 replaces a character string included in the resource with an abbreviated character string on the basis of the abbreviated character string record in the database 382, which is generated in processing in S315 (S365). Thereafter, the resource transmission unit 216 transmits the resource including the abbreviated character string to the client 300 (S323).

In this modification example, the character string of the resource is replaced with the abbreviated character string on the basis of a result of generation of the abbreviated character string in the document. With this, after the document and the association information are precedently transmitted to the client 300, replacement with the abbreviated character string can also be executed in the resource so as to have consistency with the replacement in the document. Therefore, it is possible to start displaying the document in the client 300 without waiting completion of replacement with the abbreviated character string in the resource.

Note that the processing flow of the client in this modification example can be similar to that of FIG. 12 except that the resource reception unit 308 receives the resource after receiving the document and the association information, and therefore detailed description thereof is omitted. Although an example where information that associates an original character string and an abbreviated character string with each other is stored in the database has been described in the above description of this embodiment, the information does not necessarily need to be stored in the database, and a file or the like may be used in other examples.

5. Embodiment 4

5-1 Function Configuration

Figure 14A:
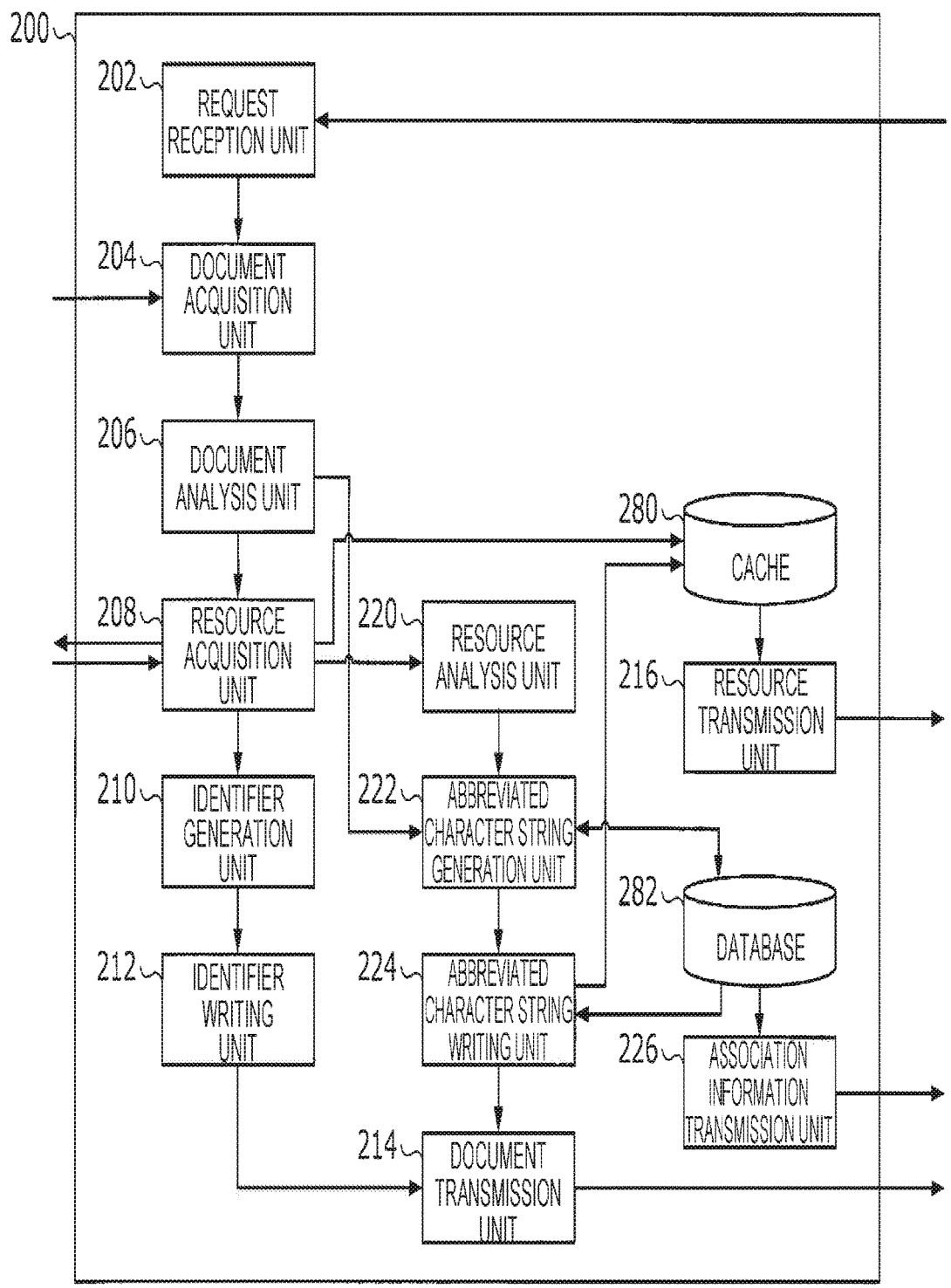
FIG. 14A is a block diagram showing a schematic function configuration of an intermediate server according to Embodiment 4 of the present disclosure.
Figure 14B:
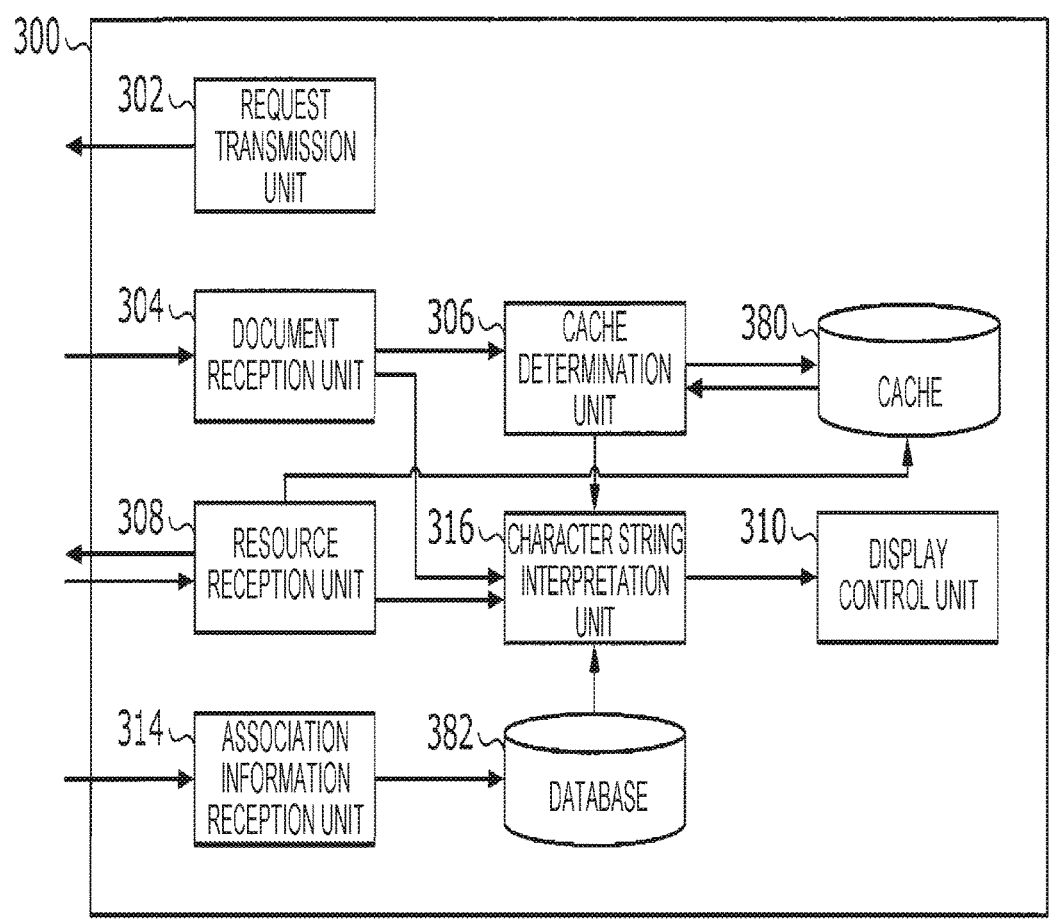
FIG. 14B is a block diagram showing a schematic function configuration of a client according to Embodiment 4 of the present disclosure.

FIG. 14 (FIG. 14A and FIG. 14B) is block diagrams showing schematic function configurations of an intermediate server and a client according to Embodiment 4 of the present disclosure. When referring to FIG. 14A, the intermediate server 200 includes, as a function configuration, the request reception unit 202, the document acquisition unit 204, the document analysis unit 206, the resource acquisition unit 208, the identifier generation unit 210, the identifier writing unit 212, the resource analysis unit 220, the abbreviated character string generation unit 222, the abbreviated character string writing unit 224, the document transmission unit 214, the association information transmission unit 226, and the resource transmission unit 216. When referring to FIG. 14B, the client 300 includes, as a function configuration, the request transmission unit 302, the document reception unit 304, the association information reception unit 314 the character string interpretation unit 316, the cache determination unit 306, the resource reception unit 308, and the display control unit 310.

For example, those function configurations can be realized by causing the processors included in the information processing devices that realize the intermediate server 200 and the client 300 to operate in accordance with programs stored in memories or recording media. A cache 280 and database 282 in the intermediate server 200 and a cache 380 and a database 382 in the client 300 can be realized by, for example, storages or memories of the respective information processing devices.

As is clear from FIG. 14, this embodiment is an embodiment obtained by combining Embodiment 1 with Embodiment 3. The function configurations of the intermediate server 200 and the client 300 have already been described in Embodiments 1 and 3, and therefore detailed description thereof is omitted.

5-2. Processing Flow

A processing flow of this embodiment will be described. Note that, in the following description, a more complicated processing flow obtained by combining the modification examples of Embodiment 1 and Embodiment 3 will be described. However, it is easily understood that an example obtained by combining examples which are not the modification examples can also be similarly realized.

(Processing Flow of Intermediate Server)

FIG. 15 (FIG. 15A and FIG. 15B) is a flowchart showing processing of the intermediate server according to Embodiment 4 of the present disclosure. When referring to FIG. 15, first, the request reception unit 202 receives a request from the client 300 (S401). Next, the document acquisition unit 204 acquires a document specified in the request (S403). Then, the document analysis unit 206 analyzes the acquired document (S405).

Herein, regarding a reference to a resource detected in the document, the resource acquisition unit 208 acquires the resource that is referred to (S407). The identifier generation unit 210 generates a unique identifier on the basis of content of the acquired resource (S409). The identifier writing unit 212 associates the generated unique identifier with the reference to the resource in the document (S411). Note that the above processing may be executed every time when one or a plurality of references to the resources are detected or the references may be collectively executed after all the references to the resources are detected.

Before or after the above S407 to S411 or along with this, the abbreviated character string generation unit 222 generates an abbreviated character string of a character string that is detected in the document and can be abbreviated (S413). At this time, the abbreviated character string generation unit 222 adds, to the database 282, an abbreviated character string record in which an original character string and the abbreviated character string are associated with each other (S415) Further, the abbreviated character string writing unit 224 replaces the character string included in the document with the abbreviated character string in accordance with the abbreviated character string record in the database 282 (S417). Note that, in the case where S407 to S411 and S413 to S417 are executed in parallel with each other as in an example shown in FIG. 15A, the reference to the resource in the document does not need to be a target of generation of an abbreviated character string.

When the above processing is completed, the document transmission unit 214 transmits, to the client 300, the document updated by the identifier writing unit 212 and the abbreviated character string writing unit 224 (S419). Before or after this or along with this, the association information transmission unit 226 transmits, to the client 300, association information generated on the basis of the record in the database 282 (S421).

Before or after transmission of the document and the association information or along with this, the resource analysis unit 220 analyzes the resource acquired in S407 (S423). Thereafter, the abbreviated character string writing unit 224 replaces a character string included in the resource with an abbreviated character string on the basis of the abbreviated character string record in the database 282, the abbreviated character string record being generated in processing performed by the abbreviated character string generation unit 222 regarding the document (S425). Thereafter, the resource transmission unit 216 transmits the resource to the client 300 in response to the request for the resource from the client 300 (S427).

(Processing Flow of Client)

FIG. 16 (FIG. 16A and FIG. 16B) is a flowchart showing processing of the client according to Embodiment 4 of the present disclosure. When referring to FIG. 16, first, the request transmission unit 302 transmits a request to the intermediate server 200 (S451). Then, the document reception unit 304 receives a document transmitted by the intermediate server 200 in response to the request (S453).

Before or after reception of the document or along with this, the association information reception unit 314 receives association information transmitted from the intermediate server 200 (S455). The association information reception unit 314 generates an abbreviated character string record in the database 382 on the basis of the received association information (S457). Then, the character string interpretation unit 316 interprets an abbreviated character string included in the document with reference to the database 382 (S459). The display control unit 310 starts displaying the received document on the basis of interpretation performed by the character string interpretation unit 316 (S461).

In the case where a reference to a resource is found in the document (YES in S463), the cache determination unit 306 determines whether or not the resource that is referred to in the received document is stored (cached) in the cache 380 (S465). As described above, the cache determination unit 306 determines whether or not the resource is stored in the cache 380 on the basis of an identifier that is unique to content of the resource and is associated with the reference to the resource in the document.

In the case where it is determined that the resource is stored in the cache 380 (YES in S465), the cache determination unit 306 reads out the resource from the cache 380 and provides the resource to the character string interpretation unit 316. That is, the cache determination unit 306 reuses the cached 380 resource (S467). On the contrary, in the case where it is determined that the resource is not stored in the cache 380 (NO in S465), the cache determination unit 306 transmits a request for the resource to the intermediate server 200 (S469). The resource reception unit 308 receives the resource transmitted by the intermediate server 200 in response to the request (S471).

The character string interpretation unit 316 interprets the reused resource or the abbreviated character string included in the resource received from the intermediate server 200 on the basis of the record in the database 382 (S473). The display control unit 310 continues to display the document with the use of results obtained by the character string interpretation unit 316 interpreting the abbreviated character strings included in the document and the resource (S475). S465 to S475 can be repeatedly executed until all the references to the resources in the document are found. In the case where the display control unit 310 displays the whole document and the reference to the resource is no longer found or no reference to a resource has been found (NO in S463), the client 300 completes display of the document (S477).

Note that, in this embodiment, in the case where the cache 380 in the client 300 is used for the resource, the abbreviated character string included in the resource is desired to be identical regardless of an opportunity in which the resource is referred to. Therefore, for example, in the intermediate server 200, the abbreviated character string generation unit 222 may generate an abbreviated character string with the use of a predetermined algorithm and may automatically generate the same abbreviated character string with respect to the same original character string. Alternatively, the same abbreviated character string may be generated with respect to the same original character string by using the database 282 in the intermediate server 200 in common in a plurality of documents.

6. Embodiment 5

FIG. 17 is a flowchart showing processing of an intermediate server according to Embodiment 5 of the present disclosure. Note that a series of processes shown in FIG. 17 can be executed by causing a processor included in an information processing device that realizes the intermediate server 200 to operate in accordance with a program stored in a memory or a recording medium.

When referring to FIG. 17, first, the processor receives a request from the client 300 (S501). Next, the processor acquires a document specified in the request (S503). The processor may acquire the document from the distribution source server 100 or may internally acquire the document from the cache in the same way as the processors in other embodiments described above. Then, the processor acquires a resource that is referred to in the document (S505). The resource may also be acquired from the distribution source server 100 or may also be internally acquired from the cache.

Further, the processor generates intermediate data on the basis of the acquired document and resource (S507). Generation of the intermediate data includes, for example, generation of the document object model (DOM) using parsing of an HTML document, generation of a computed style using processing of CSS, and conversion of JavaScript into an intermediate representation using parsing, and the like. The processor transmits the generated intermediate data to the client 300 (S509).

Figure 18:
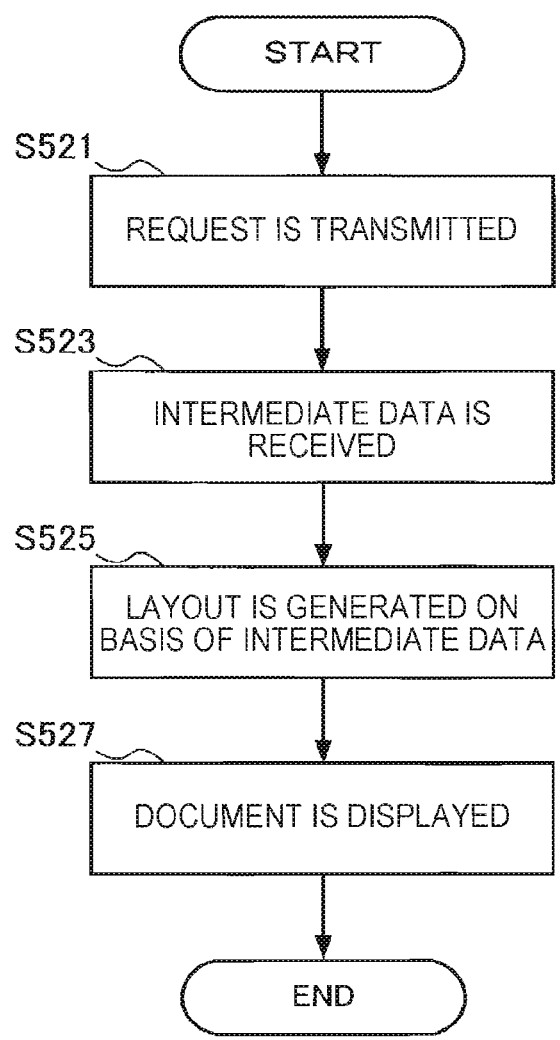
FIG. 18 is a flowchart showing processing of a client according to Embodiment 5 of the present disclosure.

FIG. 18 is a flowchart showing processing of a client according to Embodiment 5 of the present disclosure. Note that a series of processes shown in FIG. 17 can be executed by causing a processor included in an information processing device that realizes the client 300 to operate in accordance with a program stored in a memory or a recording medium.

When referring to FIG. 18, first, the processor transmits a request to the intermediate server 200 (S521). Then, the processor receives intermediate data based on a document and a resource transmitted by the intermediate server 200 in response to the request (S523). The processor generates a layout on the basis of the received intermediate data (S525) and displays the document in accordance with the layout (S527).

According to this embodiment, part of processing for displaying the document in the client 300 is executed in the intermediate server 200 instead of the client 300. With this, in the case where throughput of the intermediate server 200 is higher than that of the client 300, a time between transmission of the request and completion of display of the document in the client 300 is reduced.

Note that what intermediate data is generated in the intermediate server 200 is appropriately determined on the basis of a state of a network, the throughput of the client 300, and the like. For example, among the above three examples regarding the HTML document, only one example may be employed, any two examples may be employed, or all three examples may be employed.

7. Embodiment 6

Figure 19:
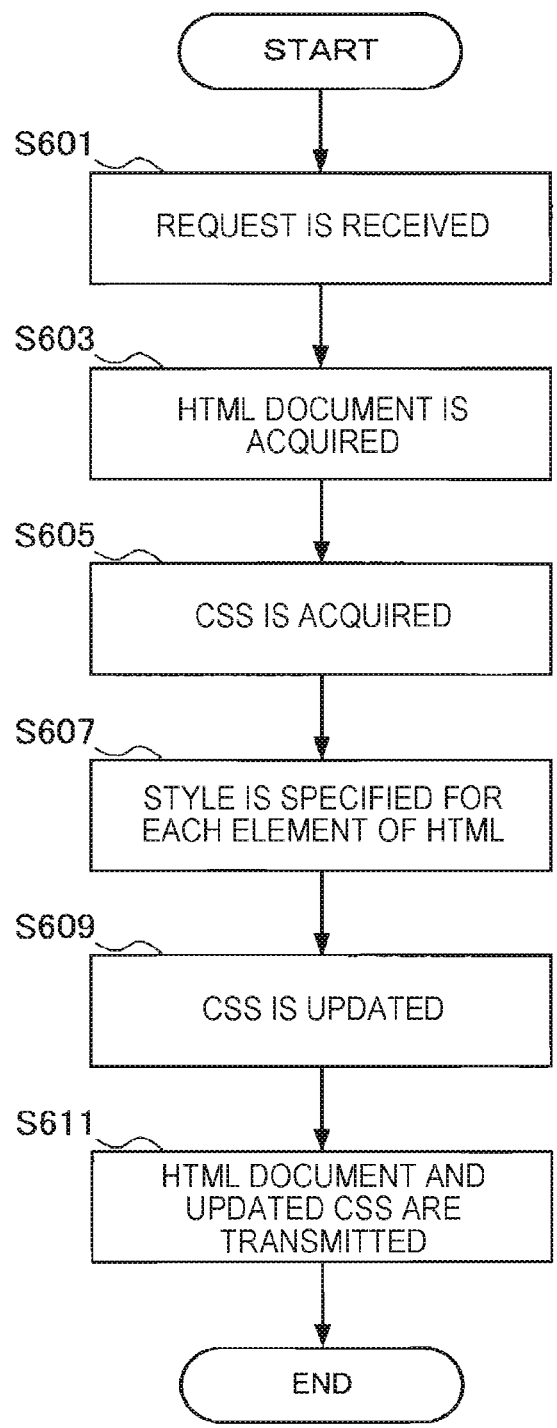
FIG. 19 is a flowchart showing processing of an intermediate server according to Embodiment 6 of the present disclosure.

FIG. 19 is a flowchart showing processing of an intermediate server according to Embodiment 6 of the present disclosure. Note that a series of processes shown in FIG. 17 can be executed by causing a processor included in an information processing device that realizes the intermediate server 200 to operate in accordance with a program stored in a memory or a recording medium. Note that, only in this embodiment, description will be provided assuming that a document is an HTML document and a resource is CSS.

When referring to FIG. 19, first, the processor receives a request from the client 300 (S601). Next, the processor acquires an HTML document specified in the request (S603). The processor may acquire the HTML document from the distribution source server 100 or may internally acquire the document from the cache in the same way as the processors in other embodiments described above. Then, the processor acquires CSS that is referred to in the HTML document (S605). The CSS may also be acquired from the distribution source server 100 or may also be internally acquired from the cache.

Further, the processor specifies a style defined by CSS for each element of the HTML document (S607). In the case where a plurality of kinds of CSS that have a hierarchical structure in the HTML document are referred to, which combination of styles among the plurality of kinds of CSS is employed is specified by processing in S607. The processor updates the CSS on the basis of a result of the processing in S607 (S609) and transmits the updated CSS together with the document to the client 300 (S611).

In this embodiment, the client 300 displays the HTML document on the basis of the HTML document and the CSS received from the intermediate server 200. Processing for this is similar to processing for displaying a normal HTML document, and therefore detailed description thereof is omitted. However, in this embodiment, the CSS referred to in the client 300 has been optimized by the above processing in the intermediate server 200. Therefore, the client 300 can omit a large part of processing for specifying a style defined for each element of the HTML document. With this, in the case where throughput of the intermediate server 200 is higher than that of the client 300, a time between transmission of the request and completion of display of the document in the client 300 is reduced.

Note that, although the resource is CSS in the above description, other resources such as an image and a script can be referred to together with CSS in an HTML document.

8. Embodiment 7

8-1. Function Configuration

Figure 20:
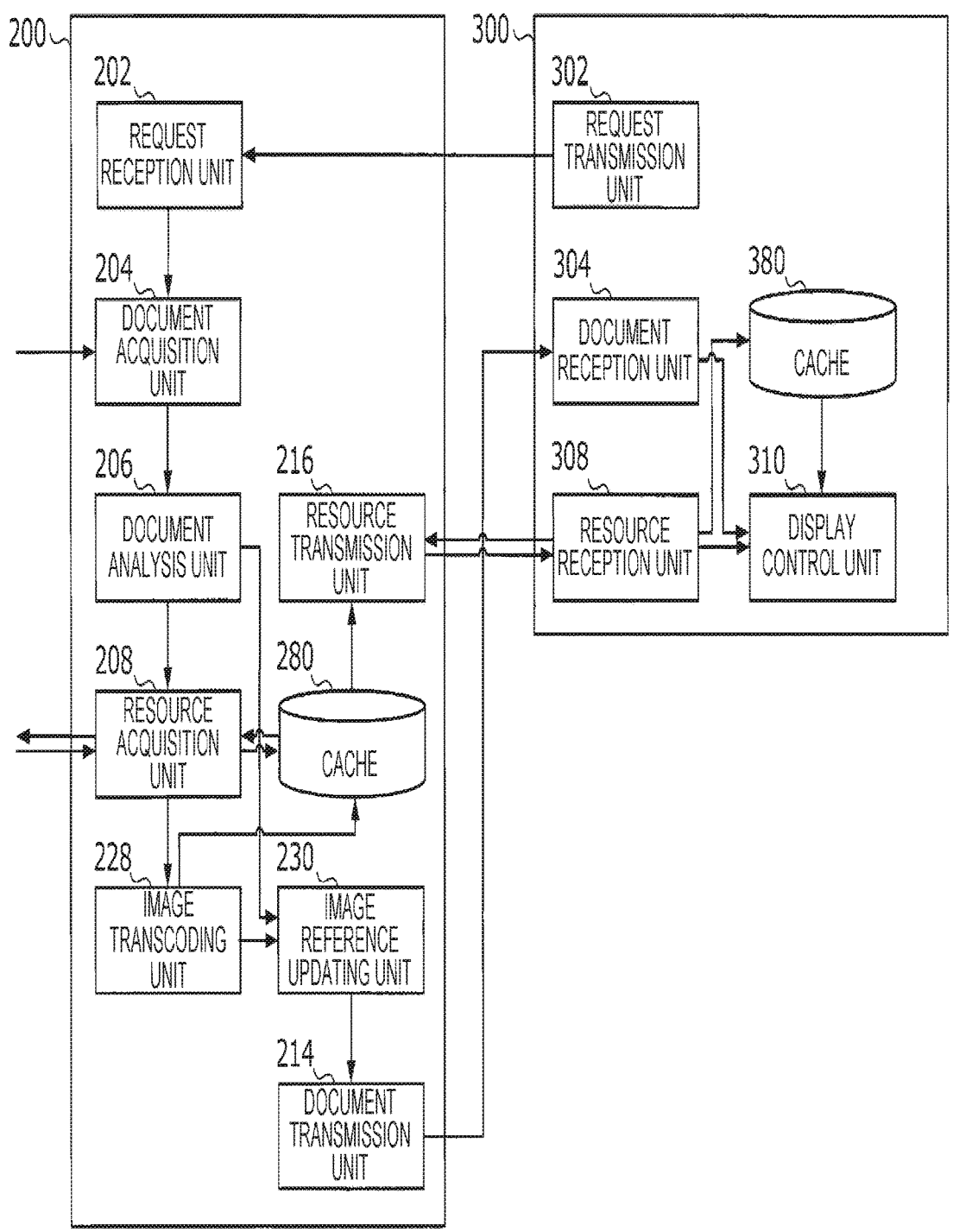
FIG. 20 is a block diagram showing a schematic function configuration of an intermediate server and a client according to Embodiment 7 of the present disclosure.

FIG. 20 is block diagrams showing schematic function configurations of an intermediate server and a client according to Embodiment 7 of the present disclosure. When referring to FIG. 20, the intermediate server 200 includes, as a function configuration, the request reception unit 202, the document acquisition unit 204, the document analysis unit 206, the resource acquisition unit 208, an image transcoding unit 228, an image reference updating unit 230, the document transmission unit 214, and the resource transmission unit 216. The client 300 includes, as a function configuration, the request transmission unit 302, the document reception unit 304, the resource reception unit 308, and the display control unit 310.

For example, those function configurations can be realized by causing the processors included in the information processing devices that realize the intermediate server 200 and the client 300 to operate in accordance with programs stored in memories or recording media. A cache 280 in the intermediate server 200 and a cache 380 in the client 300 can be realized by, for example, storages or memories of the respective information processing devices.

(Intermediate Server)

In the intermediate server 200, the request reception unit 202 and the document acquisition unit 204 acquire a document in response to a request from the client 300 in the same way as the request reception unit 202 and the document acquisition unit 204 in Embodiment 1 described above. Further, the document analysis unit 206 analyzes the document acquired by the document acquisition unit 204 and detects a reference to a resource included in the document. In the case where the reference to the resource is detected by the document analysis unit 206, the resource acquisition unit 208 acquires the resource that is referred to.

Herein, the resource acquired by the resource acquisition unit 208 includes images having various formats. The image transcoding unit 228 transcodes the formats of the acquired images to a predetermined format and stores the transcoded images in the cache 280. The image reference updating unit 230 updates references to image resources included in the document to references to the images that have been transcoded by the image transcoding unit 228 and have been stored in the cache 280. The document transmission unit 214 transmits the document in which the references have been updated to the client 300. The resource transmission unit 216 transmits a resource stored in the cache 280 in response to a request from the client 300. The transmitted resources can include an image whose format has been transcoded by the image transcoding unit 228 to a predetermined format.

(Client)

In the client 300, the request transmission unit 302 and the document reception unit 304 transmit a request to the intermediate server 200 and receive a document transmitted by the intermediate server 200 in response to the request in the same way as the request transmission unit 302 and the document reception unit 304 in Embodiment 1. The display control unit 310 displays the received document. At this time, in the case where a resource that is referred to in the document is not stored in the cache 380, the resource reception unit 308 transmits a request to the intermediate server 200 and receives the resource transmitted in response to the request. The received resource herein can include an image whose format has been transcoded by the image transcoding unit 228 to a predetermined format. The display control unit 310 displays the document with the use of the resource stored in the cache 380 or the resource received by the resource reception unit 308.

8-2. Processing Flow

Figure 21:
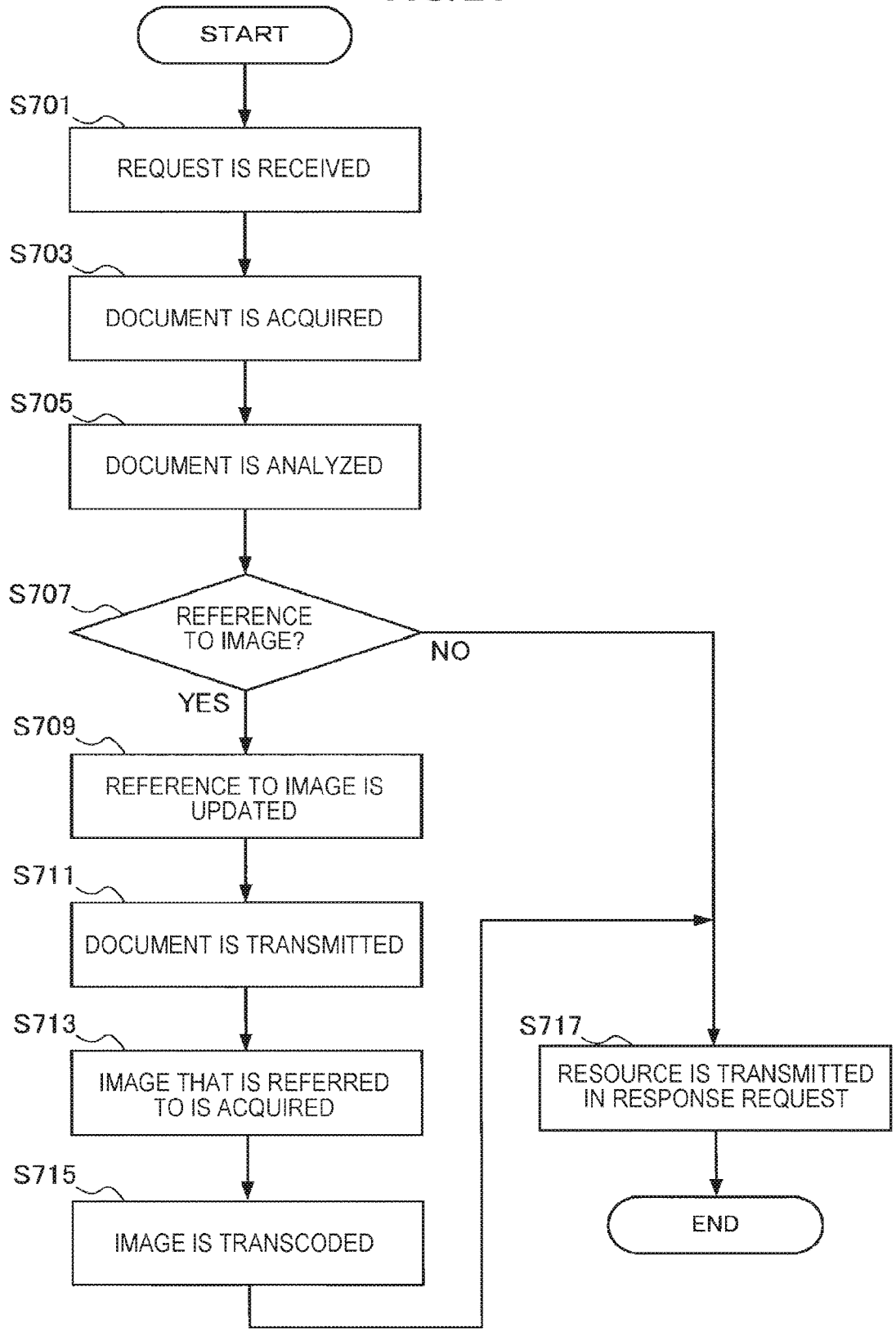
FIG. 21 is a flowchart showing processing of the intermediate server according to Embodiment 7 of the present disclosure.

FIG. 21 is a flowchart showing processing of the intermediate server according to Embodiment 7 of the present disclosure. When referring to FIG. 21, first, the request reception unit 202 receives a request from the client 300 (S701). Next, the document acquisition unit 204 acquires a document specified in the request (S703). Then, the document analysis unit 206 analyzes the acquired document (S705).

Herein, in the case where a reference to an image is detected in analysis of the document (YES in S707), first, the image reference updating unit 230 updates the reference to the image resource included in the document to a reference to a transcoded image (S709). In an example shown in FIG. 21, because the image has not been transcoded yet at this time, an identifier of the transcoded image, such as a file name, is determined in advance. The determined identifier is written in the reference in the document while being temporarily stored in the memory of the intermediate server 200 and is associated with the transcoded image to be generated thereafter.

Then, the document transmission unit 214 transmits the document in which the reference to the image resource has been updated to the client 300 (S711). After transmission of the document or along with this, the resource acquisition unit 208 acquires the image that is referred to (S713). The image transcoding unit 228 transcodes a format of the acquired image to a predetermined format (S715). Note that, in the case where the transcoded image has already been stored in the cache 280, the image transcoding unit 228 may omit repetitious transcoding processing. Thereafter, the resource transmission unit 216 transmits the resource including the transcoded image to the client 300 in response to a request for the resource from the client 300 (S717).

As described above, it takes some time to transcode an image even in the case where throughput of the intermediate server 200 is higher than that of the client 300. Therefore, as in the above processing flow, a time to complete display of the document in the client 300 can be reduced by determining an identifier of a transcoded image in advance, precedently transmitting a document including an updated reference to the image to the client 300 from the intermediate server 200, and starting display in the client 300 upon receipt of the document while transcoding the image in the intermediate server 200.

For example, in the case where there is few references to images in the document or many of images that are referred to have already been transcoded and stored in the cache 280 of the intermediate server 200, the document transmission unit 214 may transmit the document to the client 300 after the image transcoding unit 228 completes transcoding of the images. Note that, in any case, processing in the client 300 is similar to processing for displaying a normal document except that a transcoded image is included in a resource that is referred to, and therefore detailed description thereof is omitted.

8-3. Example of Transcoding

An example of transcoding an image in this embodiment will be further described.

Images included in a resource acquired from the distribution source server 100 are normally written in various formats such as JPEG, PNG and GIF. Further, frequently, the images do not strictly comply with those formats. Thus, various cases need to be considered when images acquired from the distribution source server 100 (including an image cached in the intermediate server 200 or the client 300) are decoded in the client 300, and therefore it is difficult to optimize processing, and efficiency of the processing is not necessarily high. In data transferred to the client 300 from the intermediate server 200 to display the document, a ratio of images is large in many cases, and therefore a demand for reduction in an amount of data of images is still high.

In view of this, in this embodiment, an image is transcoded in the intermediate server 200. For example, when the image transcode 282 of the intermediate server 200 only transcodes formats of images acquired from the distribution source server 100 to pure forms of the respective formats, decoding can be optimized in the client 300 to some extent, and therefore display of a document can be speeded up. Further, in the case where the image transcode 282 transcodes formats of images acquired from the distribution source server 100 to one or a plurality of predetermined formats that can optimize decoding processing in the client 300, it is possible to further speed up display of the document.

8-4. Example of Format

An example of a format of an image that can be applied to transcoding of an image in this embodiment will be further described. A format of an image in the following description may be implemented in combination with, for example, transcoding in the intermediate server in this embodiment. However, the format is not limited to such an example, and there are various advantages also in the case where a format of an image itself is implemented. That is, the embodiments of the present disclosure can include a format of an image independent from transcoding (e.g., an image processing device or an image processing method that treats an image having the above format).

Figure 22:
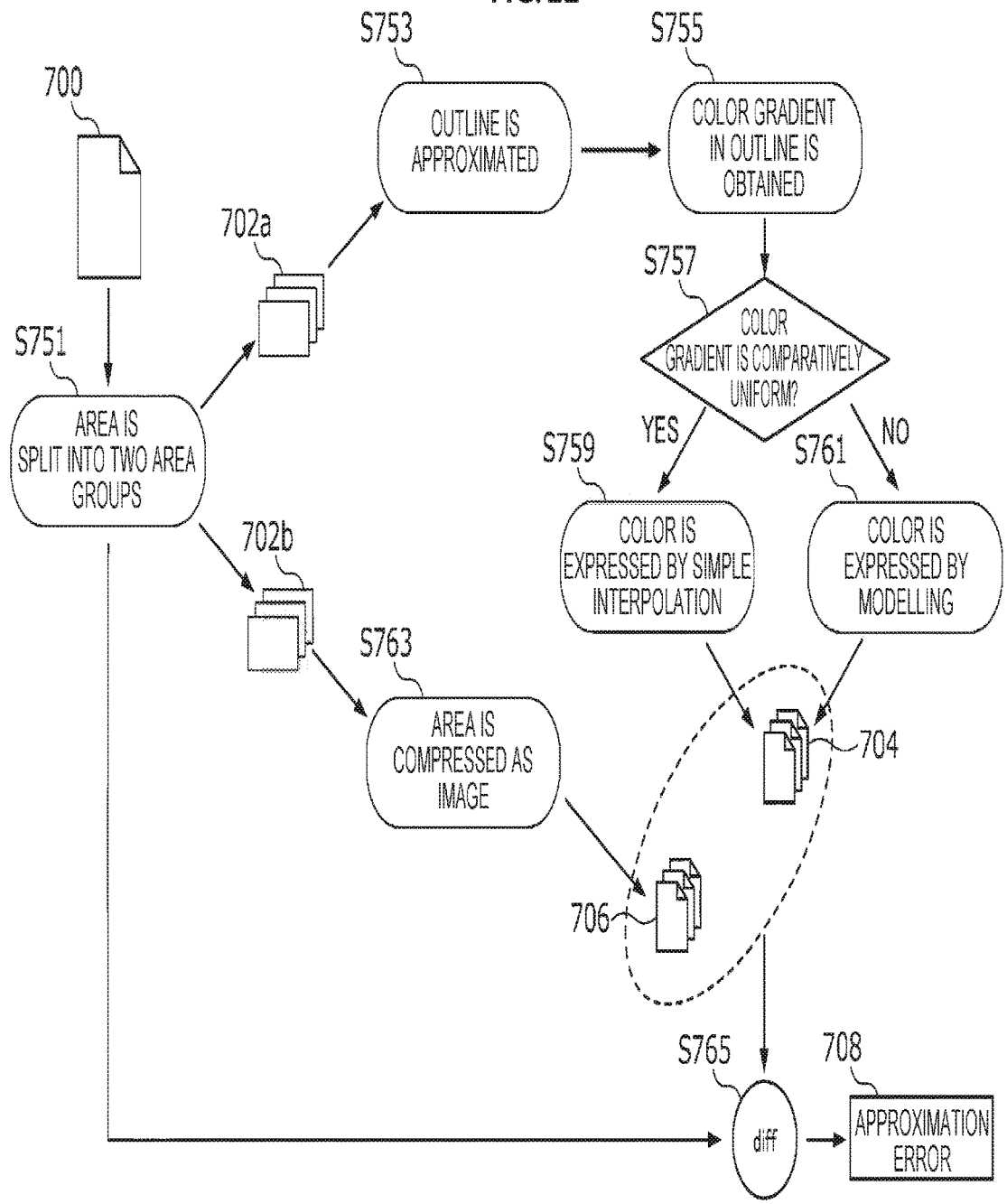
FIG. 22 is a diagram for explaining processing for generating an image file in accordance with an image format that is applicable in Embodiment 7 of the present disclosure.

FIG. 22 and FIG. 23 are diagrams for explaining processing for generating an image file in accordance with an image format that is applicable in Embodiment 7 of the present disclosure. The processing described herein can be executed by, for example, the image transcoding unit 228 of the above intermediate server 200.

First, as shown in FIG. 22, a vector component 704, a bitmap component 706, and an approximation error 708 are calculated on the basis of an original image 700 written in a bitmap format (including JPEG, PNG, GIF, and the like). In this processing, first, the original image 700 is split into two area groups 702*a* and 702*b* (S751). The area group 702*a* has low spatial frequencies and has wide areas. On the contrary, the area group 702*b* has high spatial frequencies and has narrow areas. Splitting of the area can be realized by various publicly known techniques such as a split-and-merge method.

Regarding the area group 702a, the vector component 704 is generated by processing in S753 to S761. First, edges of each area included in the area group 702a are extracted and an outline is approximated by using a Bezier curve (S753). Further, a color gradient in the approximated outline is obtained (S755). Herein, in the case where the color gradient is comparatively uniform (YES in S757), a vertex color is set and color in the area is expressed by simple interpolation (S759). In the case where the color gradient is not uniform, color in the area is expressed by modelling (S761). As a model, for example, a shading model of three-dimensional computer graphics or the like is applicable. In the shading model, it is possible to express specularity or the like by setting a cubic surface and a light source. By performing the above processing, an approximated outline and color in the outline in each area of the area group 702a are expressed, and therefore the vector component 704 can be generated.

Meanwhile, each area of the area group 702b is compressed as an image, and therefore the bitmap component 706 is generated (S763). For compression of the image in S763, a publicly known technique such as a discrete cosine transform (DCT) or vector quantization (VQ) can be used.

Differences between the vector components 704 and the original image 700 are calculated in the areas of the area group 702a, and differences between the bitmap components 706 and the original image 700 are calculated in the areas of the area group 702b (S765), and therefore the approximation errors 708 between the vector components 704 and the bitmap components 706 and the original image 700 can be obtained.

As shown in FIG. 23, an encoded image file 714 is generated on the basis of the vector components 704, the bitmap components 706, and the approximation errors 708. First, the area of the original image 700 is split on the basis of bounding boxes (bbox) of the vector components 704 and the bitmap components 706, and a k-d tree 710 indicating the above splitting is generated (S767). Further, the approximation errors 708 are allocated by area splitting lines of the k-d tree 710 (S769), and therefore approximation error components 712 can be obtained.

The vector components 704, the bitmap components 706, the k-d tree 710, and the approximation error components 712 obtained as described above are serialized (S771), and therefore the image file 714 is generated.

The k-d tree 710 is written at the top of the image file 714 as structure data. With this, it is possible to quickly seek a component of an area to be drawn. After that, the vector components 704, the bitmap components 706, and the approximation error components 712 are written. Note that arrangement order of components other than the k-d tree 710 in the image file 714 is not particularly limited.

In the vector components 704, each piece of vertex data is normalized by bbox. Therefore, it is possible to reduce significant figures needed by a mantissa, thereby compressing data. Regarding the approximation error components 712, run-length compression can be performed in the case where many of areas have an error 0. Even in the case where errors exist, distribution is supposed to be concentrated in small errors, and therefore it is possible to perform compression with the use of an algorithm such as LZW.

The vector component 704 expresses, for example, painting out of an area surrounded by a Bezier curve with a single color. The following is an example of written content of the vector component 704. Note that, although the written content is expressed in a PostScript format in the example for convenience of explanation, the actual vector component 704 is subjected to, for example, binary encoding and is then compressed.

```
newpath
0   100   moveto
100  50   150  50   250  0   rcurveto
100  -50  150  -50  250  0   rcurveto
closepath
0.3  1.0  setcolor
fill
```

The bitmap component 706 expresses, for example, application of a bitmap pattern to a rectangular area. The following is an example of written content of the bitmap component 706. Note that, although the written content is expressed in a PostScript format in the example for convenience of explanation, the actual bitmap component 706 is subjected to, for example, binary encoding and is then compressed. Note that "xxxx piximage" indicates a bitmap used as "Fill pattern".

```
newpath
100  100  moveto
100  0    rlineto
0    100  rlineto
-100 0    rlineto
closepath
xxxx piximage
fill
```

8-5. Example of Decoding Processing

An example of processing performed when the image file 714 in the above example is decoded in the client 300 will be described.

(Case where Decoding is Performed after Downloading is Completed)

Processing performed when decoding is performed after downloading is completed will be described. In this case, the display control unit 310 of the client 300 draws the vector components 704 included in the image file 714 in order. In this example, in the case where passes are repeated, a pass of the vector component 704 drawn later is prioritized.

Then, the display control unit 310 draws the bitmap components 706 included in the image file 714 in order. At this time, drawing by using the bitmap components 706 is overwritten on drawing by using the vector components 704. In the case where passes of the bitmap components 706 are repeated, a pass of the bitmap component 706 drawn later is prioritized.

Then, the display control unit 310 adds the approximation error components 712 to images in the respective areas. The approximation error components 712 may be added in terms of, for example, red, green, blue, and alpha (RGBA).

(Case where Drawing is Performed in the Middle of Downloading)

In the case where drawing is performed in the middle of downloading, as a first example, the display control unit 310 of the client 300 draws the vector components 704, the bitmap components 706, and the approximation error components 712 in this order in accordance with progress in downloading of the image file 714. This makes it possible to perform display so that color in a wide range is fixed first and an image is gradually refined thereafter.

Further, as a second example, the display control unit 310 of the client 300 downloads the k-d tree 710 at the top of the image file 714. The display control unit 310 can obtain pointer information to the vector component 704, the bitmap component 706, and the approximation error component 712 corresponding to a specific area from the k-d tree 710. Then, the display control unit 310 downloads the vector component 704, the bitmap component 706, and the approximation error component 712 referred to by the above pointer information with the use of file seeking, an HTTP range request, or the like. The display control unit 310 draws the vector component 704, the bitmap component 706, and the approximation error component 712 in this order in the above specific range with the use of downloaded data, and thus decoding of the area is terminated.

According to this embodiment described above, for example, a communication capacity can be reduced by reducing a file size of an image that is referred to in a document. Further, in the case where the image is partially simple gradation or is partially painted out with a single color, those parts are vectorized by transcoding, and therefore it is possible to speed up decode processing.

9. Hardware Configuration

Next, a hardware configuration of the information processing device according to an embodiment of the present disclosure will be described with reference to FIG. 24. FIG. 24 is a block diagram for explaining an example of the hardware configuration of the information processing device according to an embodiment of the present disclosure. An information processing device 900 illustrated in the figure may realize the server, the client, or the like in the aforementioned embodiments.

The information processing device 900 includes a CPU (Central Processing Unit) 901, a ROM (Read Only Memory) 903, and a RAM (Random Access Memory) 905. In addition, the information processing device 900 may include a host bus 907, a bridge 909, an external bus 911, an interface 913, an input device 915, an output device 917, a storage device 919, a drive 921, a connection port 923, and a communication device 925. Further, the information processing device 900 may include an imaging device 933 and a sensor 935 as necessary. The information processing device 900 may include a processing circuit such as a DSP (Digital Signal Processor) or ASIC (Application Specific Integrated Circuit), alternatively or in addition to the CPU 901.

The CPU 901 serves as an operation processor and a controller, and controls all or some operations in the information processing device 900 in accordance with various programs recorded in the ROM 903, the RAM 905, the storage device 919 or a removable recording medium 927. The ROM 903 stores programs and operation parameters which are used by the CPU 901. The RAM 905 temporarily stores programs which are used in the execution of the CPU 901 and parameters which are appropriately modified in the execution. The CPU 901, ROM 903, and RAM 905 are connected to each other by the host bus 907 configured to include an internal bus such as a CPU bus. In addition, the host bus 907 is connected to the external bus 911 such as a PCI (Peripheral Component Interconnect/Interface) bus via the bridge 909.

The input device 915 is a device which is operated by a user, such as a mouse, a keyboard, a touch panel, buttons, switches and a lever. The input device 915 may be, for example, a remote control unit using infrared light or other radio waves, or may be an external connection device 929 such as a portable phone operable in response to the operation of the information processing device 900. Furthermore, the input device 915 includes an input control circuit which generates an input signal on the basis of the information which is input by a user and outputs the input signal to the CPU 901. By operating the input device 915, a user can input various types of data to the information processing device 900 or issue instructions for causing the information processing device 900 to perform a processing operation.

The output device 917 includes a device capable of visually or audibly notifying the user of acquired information. The output device 917 may include a display device such as an LCD (Liquid Crystal Display), a PDP (Plasma Display Panel), and an organic EL (Electro-Luminescence) displays, an audio output device such as a speaker or a headphone, and a peripheral device such as a printer. The output device 917 may output the results obtained from the process of the information processing device 900 in a form of a video such as text or an image, and an audio such as voice or sound.

The storage device 919 is a device for data storage which is configured as an example of a storage unit of the information processing device 900. The storage device 919 includes, for example, a magnetic storage device such as a HDD (Hard Disk Drive), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing device 900 or attached externally thereto. The drive 921 reads information recorded in the removable recording medium 927 attached thereto, and outputs the read information to the RAM 905. Further, the drive 921 writes a record in the removable recording medium 927 attached thereto.

The connection port 923 is a port used to directly connect devices to the information processing device 900. The connection port 923 may include a USB (Universal Serial Bus) port, an IEEE1394 port, and a SCSI (Small Computer System Interface) port. The connection port 923 may further include an RS-232C port, an optical audio terminal, an HDMI (High-Definition Multimedia Interface) port, and so on. The connection of the external connection device 929 to the connection port 923 makes it possible to exchange various data between the information processing device 900 and the external connection device 929.

The communication device 925 is, for example, a communication interface including a communication device or the like for connection to a communication network 931. The communication device 925 may be, for example, a communication card for a wired or wireless LAN (Local Area Network), Bluetooth (registered trademark), WUSB (Wireless USB) or the like. In addition, the communication device 925 may be a router for optical communication, a router for ADSL (Asymmetric Digital Subscriber Line), a modem for various kinds of communications, or the like. The communication device 925 can transmit and receive signals to and from, for example, the Internet or other communication devices based on a predetermined protocol such as TCP/IP. In addition, the communication network 931 connected to the communication device 925 may be a network or the like connected in a wired or wireless manner, and may be, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal-oxide-semiconductor (CMOS) sensor, as well as various members such as one or more lenses for controlling the formation of a subject image on the image sensor, for example. The imaging device 933 may be a device that takes still images, and may also be a device that takes moving images.

The sensor 935 is any of various sensors such as an acceleration sensor, a gyro sensor, a geomagnetic sensor, an optical sensor, or a sound sensor, for example. The sensor 935 acquires information regarding the state of the information processing device 900, such as the orientation of the case of the information processing device 900, as well as information regarding the environment surrounding the information processing device 900, such as the brightness or noise surrounding the information processing device 900, for example. The sensor 935 may also include a Global Positioning System (GPS) sensor that receives GPS signals and measures the latitude, longitude, and altitude of the apparatus.

The foregoing thus illustrates an exemplary hardware configuration of the information processing device 900. Each of the above components may be realized using general-purpose members, but may also be realized in hardware specialized in the function of each component. Such a configuration may also be modified as appropriate according to the technological level at the time of the implementation.

10. Supplementary Explanation

The embodiments of the present disclosure can include, for example, the aforementioned information processing device (server device or client device), a system, an information processing method executed in the information processing device or the system, a program causing the information processing device to function, and a non-transitory tangible medium in which the program is recorded. Note that the plurality of embodiments described above can be realized in arbitrary combination within the scope that is obvious to a person skilled in the art on the basis of description of the present specification even in the case where the specification does not clearly describe in particular that the embodiments can be combined.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Additionally, the present technology may also be configured as below.

(1)

A server device, including:

a document acquisition unit configured to acquire a document including a reference to a resource in response to a request from a client;

an identifier generation unit configured to generate an identifier unique to content of the resource;

an identifier writing unit configured to associate the identifier with the reference to the resource in the document; and a document transmission unit configured to transmit the document and the identifier associated with the reference to the resource to the client.

(2)

The server device according to (1), wherein the identifier writing unit adds the identifier to an original identifier and associates the identifier with the reference to the resource.

(3)

The server device according to (1) or (2), further including a resource precedent distribution unit configured to count the number of association of the identifier with the reference to the resource and associate the resource estimated to be frequently used on the basis of the number with the identifier to transmit the resource to the client before the request.

(4)

The server device according to (3), wherein, in a case where the resource estimated to be frequently used is a program, the resource precedent distribution unit precompiles the program and then transmits the program to the client.

(5)

The server device according to any one of (1) to (4), wherein the identifier includes a hash calculated on the basis of content of the resource.

(6)

The server device according to any one of (1) to (5), wherein, before the identifier is generated, the document transmission unit transmits, to the client, the document in which a dummy identifier is associated with the reference to the resource and, after the identifier is generated, the document transmission unit transmits, to the client, information that associates the identifier with the dummy identifier.

(7)

A client device, including:

a request transmission unit configured to transmit a request to a server;

a document reception unit configured to receive, from the server, a document including a reference to a resource, the document being transmitted from the server in response to the request, and an identifier that is associated with the reference to the resource and is unique to content of the resource; and a cache determination unit configured to determine whether or not the resource is stored in a cache on the basis of the identifier.

(8)

The client device according to (7), wherein the document reception unit receives the document including the reference to the resource with which not only an original identifier but also the identifier are associated.

(9)

The client device according to (7) or (8), further including a resource precedent reception unit configured to receive the predetermined resource associated with the identifier from the server before the request and store the received resource in a cache.

(10)

The client device according to (9), wherein, in a case where the predetermined resource is a program, the resource precedent reception unit receives the precompiled program and caches the received program.

(11)

The client device according to (10), wherein the resource precedent reception unit caches the received program in a storage area that is different from a storage area for a resource other than the program.

(12)

The client device according to any one of (7) to (11), wherein the identifier includes a hash calculated on the basis of content of the resource.

(13)

The client device according to any one of (7) to (12), wherein the document reception unit receives, from the server, the document in which a dummy identifier is associated with the reference to the resource and then receives, from the server, information that associates the identifier with the dummy identifier.

(14)

The client device according to (13), wherein, in a case where the resource is referred to in a state in which the dummy identifier is associated with the reference to the resource, the cache determination unit realizes a function of transmitting a request for the identifier to the server.

(15)

An information processing method, including:

acquiring a document including a reference to a resource in response to a request from a client;

generating an identifier unique to content of the resource;

associating, with the use of a processor, the identifier with the reference to the resource in the document; and transmitting the document and the identifier associated with the reference to the resource to the client.

(16)

A non-transitory tangible recording medium having a program recorded thereon, the program causing a computer to realize a function of transmitting a request to a server, a function of receiving, from the server, a document including a reference to a resource, the document being transmitted in response to the request, and an identifier that is associated with the reference to the resource and is unique to content of the resource, and a function of determining whether or not the resource is stored in a cache on the basis of the identifier.

REFERENCE SIGNS LIST 10 system
100 distribution server
200 intermediate server
202 request reception unit
204 document acquisition unit
206 document analysis unit
208 resource acquisition unit
210 identifier generation unit
212 identifier writing unit
214 document transmission unit
216 resource transmission unit
218 resource precedent distribution unit
220 resource analysis unit
222 abbreviated character string generation unit
224 abbreviated character string writing unit
226 association information transmission unit
228 image transcoding unit
230 image reference updating unit
280 cache
282 database
300 client
302 request transmission unit
304 document reception unit
306 cache determination unit
308 resource reception unit
310 display control unit
312 resource precedent reception unit
314 association information reception unit
316 character string interpretation unit
380 cache
382 database

The invention claimed is:

1. An intermediate server device, comprising:

reception request circuitry configured to receive a request from a client for a document;

document acquisition circuitry configured to acquire the requested document, the document including a reference to a resource;

resource acquisition circuitry configured to acquire the resource and to store the resource in a local cache of the intermediate server device;

identifier generation circuitry configured to generate an identifier unique to content of the resource which was detected in the acquired document;

identifier writing circuitry configured to associate the identifier with the reference to the resource in the document;

wherein the identifier writing circuitry adds the identifier to an absolute pass, the absolute pass indicating the intermediate server device, and associates the identifier and the absolute pass with the reference to the resource, and stores the association between the reference and the resource and the identifier and the absolute pass locally at the intermediate server device;

document transmission circuitry configured to transmit the document and the absolute pass and the identifier to the client;

wherein each of a plurality of generated identifiers is associated with the absolute pass; and resource transmission circuitry configured to receive a new request for a new resource and detect whether the new resource request has a same resource request by checking if the request includes the absolute pass.

2. The intermediate server device according to claim 1, wherein the identifier writing circuitry adds the identifier to an original identifier.

3. The intermediate server device according to claim 1, further comprising resource precedent distribution circuitry configured to count the number of association of the identifier with the reference to the resource and associate the resource estimated to be frequently used on the basis of the number with the identifier to transmit the resource to the client before the request.

4. The intermediate server device according to claim 3, wherein, in a case where the resource estimated to be frequently used is a program, the resource precedent distribution circuitry precompiles the program and then transmits the program to the client.

5. The intermediate server device according to claim 1, wherein the identifier includes a hash calculated on the basis of content of the resource.

6. The intermediate server device according to claim 1, wherein, before the identifier is generated, the document transmission circuitry transmits, to the client, the document in which a dummy identifier is associated with the reference to the resource and, after the identifier is generated, the document transmission circuitry transmits, to the client, information that associates the identifier with the dummy identifier.

7. A client device, comprising;
request transmission circuitry configured to transmit a request for a document to an intermediate server;
document reception circuitry configured to receive from the intermediate server, the document including a reference to a resource in the document, the document being transmitted from the intermediate server in response to the request, and configured to receive an identifier that is associated with the reference to the resource and is unique to content of the resource;
wherein the identifier includes an absolute pass, the absolute pass indicated the intermediate server device, and the identifier and the absolute pass are associated with the reference to the resource, and the identifier and absolute pass are stored locally at the intermediate server as having an association to the reference to the resource, and
cache determination circuitry configured to determine whether or not the resource is stored in a cache on the basis of the identifier.

8. The client device according to claim 7,
wherein the document reception circuitry receives the document including the reference to the resource with which not only an original identifier but also the identifier are associated.

9. The client device according to claim 7, further comprising resource precedent reception circuitry configured to receive the predetermined resource associated with the identifier from the intermediate server before the request and store the received resource in a cache.

10. The client device according to claim 9,
wherein, in a case where the predetermined resource is a program, the resource precedent reception circuitry receives the precompiled program and caches the received program.

11. The client device according to claim 10,
wherein the resource precedent reception circuitry caches the received program in a storage area that is different from a storage area for a resource other than the program.

12. The client device according to claim 7,
wherein the identifier includes a hash calculated on the basis of content of the resource.

13. The client device according to claim 7,
wherein the document reception circuitry receives, from the intermediate server, the document in which a dummy identifier is associated with the reference to the resource and then receives, from the intermediate server, information that associates the identifier with the dummy identifier.

14. The client device according to claim 13,
wherein, in a case where the resource is referred to in a state in which the dummy identifier is associated with the reference to the resource, the cache determination circuitry realizes a function of transmitting a request for the identifier to the intermediate server.

15. An information processing method, comprising:
receiving a request from a client for a document;
acquiring the requested document, the document including a reference to a resource;
resource acquisition circuitry configured to acquire the resource and to store the resource in a local cache of an intermediate server device;
generating an identifier unique to content of the resource which was detected in the acquired document;
associating the identifier with the reference to the resource in the document;
wherein the identifier writing circuitry adds the identifier to an absolute pass, the absolute pass indicating the intermediate server device, and associates the identifier and the absolute pass with the reference to the resource, and stores the association between the reference to the resource and the identifier and the absolute pass locally at the intermediate server device;
transmitting the document and the absolute pass and the identifier to the client;
wherein each of a plurality of generated identifiers is associated with the absolute pass; and
receiving a new request for a new resource and detect whether the new resource request has a same resource request by checking if the request includes the absolute pass.

16. A non-transitory tangible recording medium having a program recorded thereon, the program causing a computer to realize a function of:
transmitting a request for a document to an intermediate server;
receiving from the server, the document including a reference to a resource in the document, the document being transmitted from the intermediate server in response to the request, and configured to receive an identifier that is associated with the reference to the resource and is unique to content of the resource;
wherein the identifier includes an absolute pass, the absolute pass indicating the intermediate server device, and the identifies and the absolute pass are associated with the reference to the resource, and the identifier and the absolute pass are stored locally at the intermediate server as having an association to the reference to the resource; and
determining whether or not the resource is stored in a cache on the basis of the identifier.

\* \* \* \* \*